US012664010B2

(12) United States Patent　　(10) Patent No.:　US 12,664,010 B2
Cardente et al.　　　　　　　　　(45) Date of Patent:　Jun. 23, 2026

(54) HOST/DPU SERVICE PROVISIONING SYSTEM

(71) Applicant: Dell Products L.P., Round Rock, TX (US)

(72) Inventors: John Cardente, Milford, MA (US); Gaurav Chawla, Austin, TX (US); John Harwood, Boston, MA (US)

(73) Assignee: Dell Products L.P., Round Rock, TX (US)

( * ) Notice:　Subject to any disclaimer, the term of this patent is extended or adjusted under 35 U.S.C. 154(b) by 622 days.

(21) Appl. No.: 18/074,933

(22) Filed:　Dec. 5, 2022

(65)　　　　Prior Publication Data

US 2024/0184606 A1　　Jun. 6, 2024

(51) Int. Cl.
　　*G06F 9/455*　　　　(2018.01)
(52) U.S. Cl.
　　CPC ...... *G06F 9/45545* (2013.01); *G06F 9/45558* (2013.01); *G06F 2009/4557* (2013.01); *G06F 2009/45583* (2013.01)
(58) Field of Classification Search
　　CPC ............. G06F 9/45545; G06F 9/45558; G06F 2009/4557; G06F 2009/45583
　　See application file for complete search history.

(56)　　　　References Cited

U.S. PATENT DOCUMENTS

| | | | |
|---|---|---|---|
| 11,303,472 B2 | 4/2022 | Sindhu et al. | |
| 2021/0103476 A1* | 4/2021 | Lan | G06F 9/5077 |
| 2022/0086226 A1* | 3/2022 | Jain | G06F 13/105 |
| 2022/0334989 A1* | 10/2022 | Bar-Ilan | G06F 9/45558 |
| 2023/0315621 A1* | 10/2023 | Bahirat | G06F 12/0835 |
| 2024/0143372 A1* | 5/2024 | Currid | G06F 9/45558 |
| 2024/0211368 A1* | 6/2024 | Kommula | H04L 41/0604 |
| 2025/0227139 A1* | 7/2025 | Shribman | H04L 61/256 |

* cited by examiner

*Primary Examiner* — Peng Ke
(74) *Attorney, Agent, or Firm* — Joseph Mencher

(57)　　　　ABSTRACT

A computing system includes a DPU subsystem coupled to a host subsystem. The DPU subsystem receives an instruction to provide a service, and determines a host operating load of the host subsystem and a DPU operating load of the DPU subsystem during subsequent time periods. Based on the host operating load and/or the DPU operating load during a first time period, the DPU subsystem configures the DPU subsystem to provide the service, and performs service requests for the service from client system(s). Based on the host operating load and/or the DPU operating load during a second time period that is subsequent to the first time period, the DPU subsystem configures the host subsystem to provide the service in order to migrate the service from the DPU subsystem to the host subsystem, and proxies service requests for the service between the client system(s) and the host subsystem providing the service.

20 Claims, 34 Drawing Sheets

402

DPU SUBSYSTEM MONITORS OPERATING LOAD OF HOST SUBSYSTEM, DPU SUBSYSTEM, AND RESOURCE SUBSYSTEM(S)
502

SERVICE PROVISIONING INSRUCTION RECEIVED?
504

DPU SUBSYSTEM DETERMINES WHERE TO PROVIDE SERVICE BASED ON OPERATING LOAD OF HOST SUBSYSTEM, DPU SUBSYSTEM, AND RESOURCE SUBSYSTEM(S)
506

A

B

500

200

RESOURCE SYSTEM
206a

RESOURCE SYSTEM
206b

RESOURCE SYSTEM
206c

DPU MANAGEMENT
SYSTEM
208

NETWORK
204

CLIENT SYSTEM(S)
210

1400

1400

COMPUTING SYSTEM
202

HOST/DPU SERVICE PROVISIONING SYSTEM

BACKGROUND

The present disclosure relates generally to information handling systems, and more particularly to providing services using a host subsystem and a Data Processing Unit (DPU) subsystem in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are sometimes used to provide services to client devices. For example, a server device may include a Central Processing Unit (CPU) such as an x86 processor, along with a Data Processing Unit (DPU) that may include a programmable specialized electronic circuit that is configured to provide hardware acceleration of data processing for data-centric computing, and the CPU and DPU may be utilized to provide services to client devices. As will be appreciated by one of skill in the art in possession of the present disclosure, the DPU may be used to offload the provisioning of services (e.g., storage protocols) from an operating system provided by the CPU, and the provisioning of services by the CPU and/or DPU in such a manner can raise issues. For example, conventional CPU/DPU service provisioning systems may operate to provide services via the CPU by providing a static/fixed mapping of those services to the CPU such that those services are performed by the CPU, and/or offload services from the CPU to the DPU by providing a static/fixed mapping of those services to the DPU such that those services are performed by the DPU. However, DPU resources (e.g., compute resources, memory resources, storage resources, etc.) available to the DPU are often limited relative to CPU resources available to the CPU, and thus the static/fixed mapping of services to CPUs and DPUs may, in some situations, result in sub-optimal provisioning of those services to client devices.

Accordingly, it would be desirable to provide CPU/DPU provisioning system that addresses the issues discussed above.

SUMMARY

According to one embodiment, an Information Handling System (IHS) includes a Data Processing Unit (DPU) processing system; and a DPU memory system that is coupled to the DPU processing system and that includes instructions that, when executed by the DPU processing system, cause the DPU processing system to provide a DPU engine that is configured to: receive a service provisioning instruction to provide a service; determine a host operating load of a host subsystem that is housed in a chassis with the DPU processing system and the DPU memory system, and an IHS operating load of the IHS; configure, based on at least one of the host operating load and the IHS operating load, the host subsystem to provide the service; and proxy service requests for the service between at least one client system and the host subsystem providing the service.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
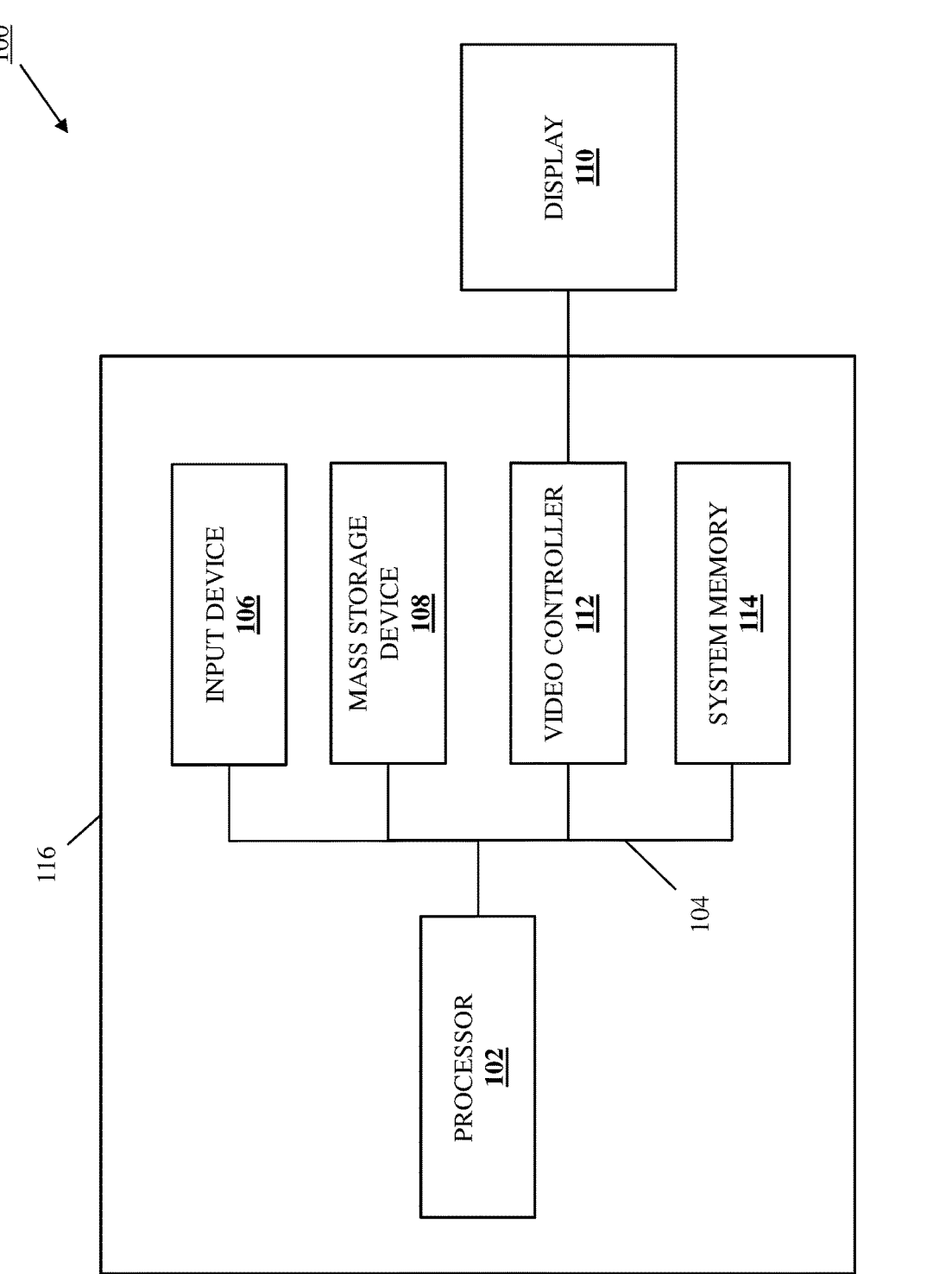
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
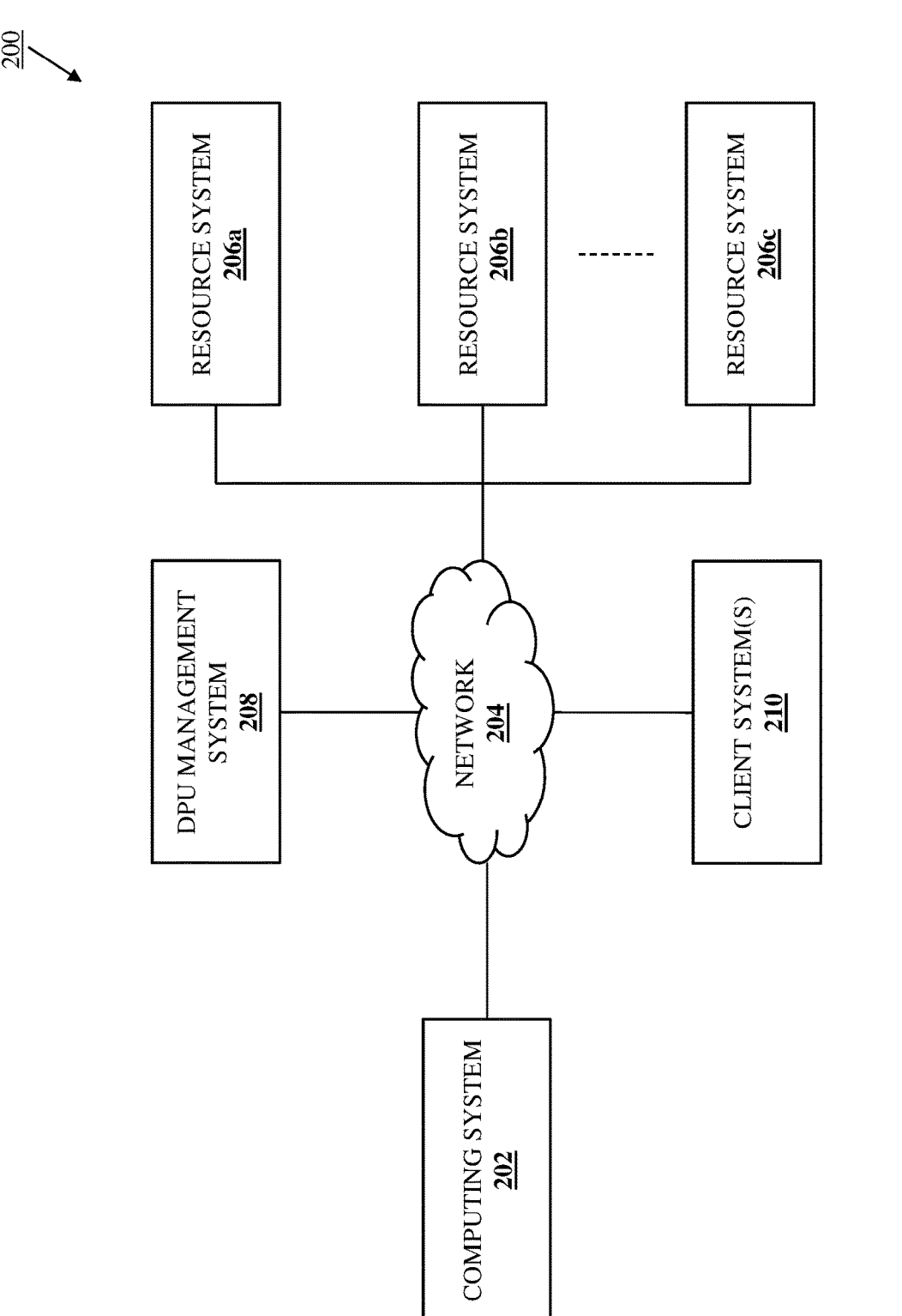
FIG. 2 is a schematic view illustrating an embodiment of a networked system that may include the host/DPU service provisioning system of the present disclosure.

Referring now to FIG. 2, an embodiment of a networked system 200 is illustrated that may include the host/DPU service provisioning system of the present disclosure. In the illustrated embodiment, the networked system 200 includes a computing system 202. In an embodiment, the computing system 202 may be provided by the IHS 100 discussed above with reference to FIG. 1, and/or may include some or all of the components of the IHS 100, and in specific examples, may be provided by a server device. However, while illustrated and discussed as being provided by a server device, one of skill in the art in possession of the present disclosure will recognize that computing systems included in the host/DPU service provisioning system of the present disclosure may be provided by any computing devices that may be configured to operate similarly as the computing system 202 discussed below.

In the illustrated embodiment, the computing system 202 is couple to a network 204 that may be provided by a Local Area Network (LAN), the Internet, combinations thereof, and/or any other network that would be apparent to one of skill in the art in possession of the present disclosure. As illustrated, a plurality of resource systems 206a, 206b, and up to 206c may be coupled to the computing system 202 via the network 204. In an embodiment, any or each of the resource systems 206a-206c may be provided by the IHS 100 discussed above with reference to FIG. 1, and/or may include some or all of the components of the IHS 100, and in specific examples may be provided by server devices (e.g., similar to the server device providing the computing system 202 discussed below) or other computing devices providing "remote hosts" that would be apparent to one of skill in the art in possession of the present disclosure, network-connected hardware accelerator devices (e.g., similar to the DPU subsystems included in the computing system 202 discussed below), network-connected memory systems, network-connected storage systems, and/or any other network-connected resource systems that would be apparent to one of skill in the art in possession of the present disclosure.

However, while described as being provided by particular network-connected resource systems, one of skill in the art in possession of the present disclosure will recognize that resource systems included in the networked system 202 of the present disclosure may be provided by any resource systems that may be configured to operate similarly as the resource systems 206*a*-206*c* discussed below. Furthermore, while illustrated and described in the examples below as being coupled to the computing system 202 via a network, one of skill in the art in possession of the present disclosure will appreciate how any of the resource systems 206*a*-206*c* may be directly connected to the computing system 202 without the use of the network 204 (e.g., as "stand-alone" devices cabled directly to the computing system 202) while remaining within the scope of the present disclosure as well.

In the illustrated embodiment, a Data Processing Unit (DPU) management system 208 is coupled to the computing system 202 via the network 204. In an embodiment, the DPU management system 208 may be provided by the IHS 100 discussed above with reference to FIG. 1, and/or may include some or all of the components of the IHS 100, and in specific examples may be provided by one or more server devices. However, while illustrated and described as being provided by stand-alone device(s) coupled to the network 204, one of skill in the art in possession of the present disclosure will appreciate how the functionality of the DPU management system 208 described below may be provided by the computing system 202 and/or any of the resource systems 206*a*-206*c* while remaining within the scope of the present disclosure as well.

In the illustrated embodiment, one or more client systems 210 are coupled to the computing system 202 via the network 204. In an embodiment, the client system(s) 210 may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or any other client computing device that would be apparent to one of skill in the art in possession of the present disclosure. However, while illustrated and described as being provided by particular computing devices that are coupled to the computing system 202 via a network, one of skill in the art in possession of the present disclosure will appreciate how the client system(s) 210 may be provided by any devices that are configured to operate similarly as the client system(s) discussed below while remaining within the scope of the present disclosure as well. For example, one of skill in the art in possession of the present disclosure will appreciate how client systems may be provided in the computing system 202 and may operate similarly as the computing system(s) 210 discussed below while remaining within the scope of the present disclosure. Furthermore, while a specific networked system 200 has been illustrated and described, one of skill in the art in possession of the present disclosure will recognize that the host/DPU service provisioning system of the present disclosure may be provided in and/or may utilize a variety of components in a variety of component configurations while remaining within the scope of the present disclosure as well.

Figure 3:
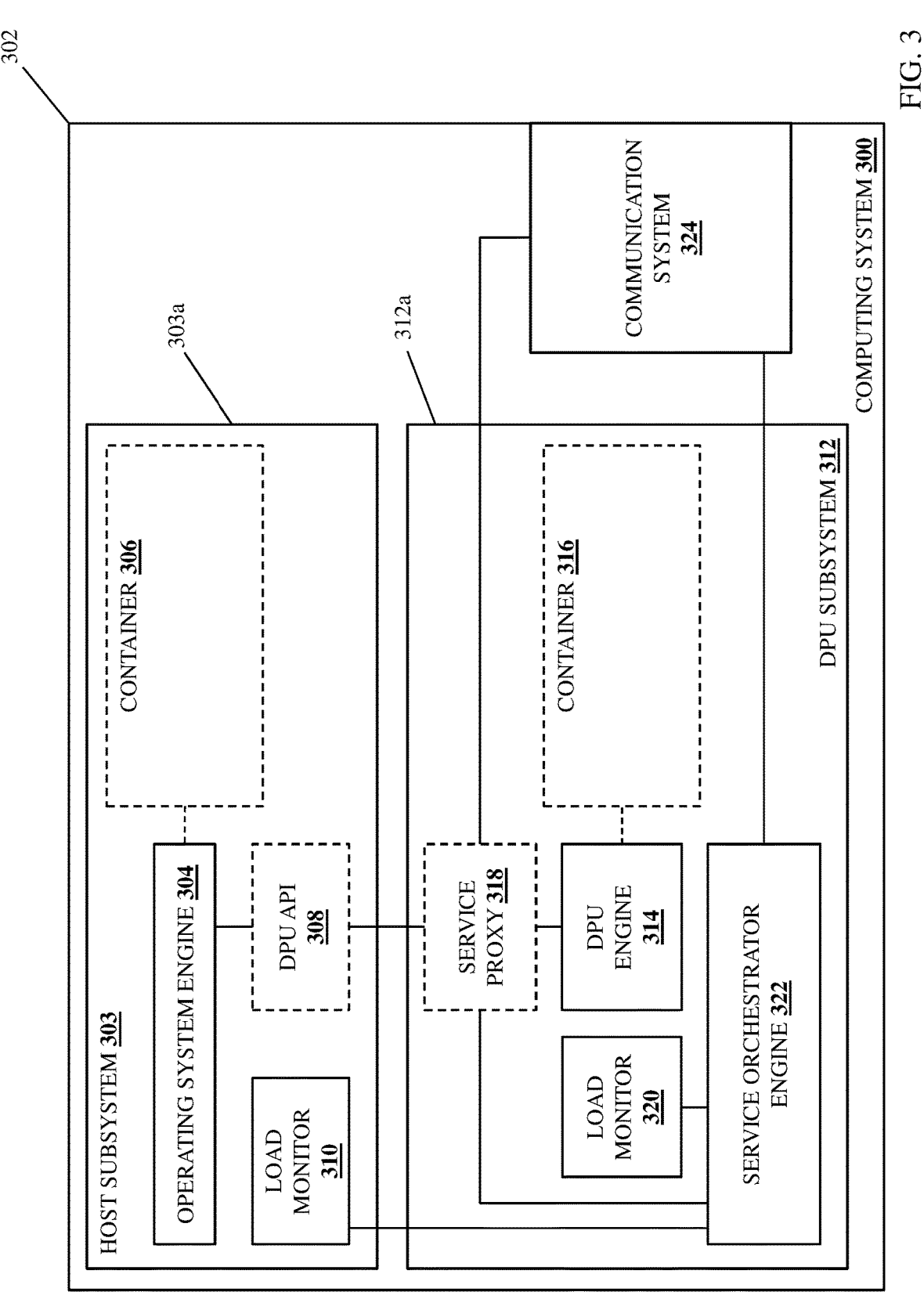
FIG. 3 is a schematic view illustrating an embodiment of a computing system that may be included in the networked system of FIG. 2 and that may provide the host/DPU service provisioning system of the present disclosure.

Referring now to FIG. 3, an embodiment of a computing system 300 is illustrated that may provide the computing system 202 discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other devices that are configured to operate similarly as the computing system 300 discussed below. In the illustrated embodiment, the computing system 300 includes a chassis 302 that houses the components of the computing system 300, only some of which are illustrated and described below. For example, the chassis 302 may house a host subsystem 303. For example, the host subsystem 303 may include a board 303*a* such as, for example, a motherboard in the chassis 302 of the computing system 300, although other techniques for providing the host subsystem 303 are envisioned as falling within the scope of the present disclosure as well.

In the illustrated embodiment, the board 303*a* of the host subsystem 303 may support a host processing system (not illustrated, but which may include the processor 102 discussed above with reference to FIG. 1 such as, for example, an x86 processor and/or other Central Processing Unit (CPU) that would be apparent to one of skill in the art in possession of the present disclosure) and a host memory system (not illustrated, but which may include the memory 114 discussed above with reference to FIG. 1) that is coupled to the host processing system and that includes instructions that, when executed by the host processing system, cause the host processing system to provide an operating system engine 304 that is configured to perform the functionality of the operating system engines, host subsystems, and/or computing systems discussed below.

As will be appreciated by one of skill in the art in possession of the present disclosure, the operating system engine 304 may be configured to provide a "host" operating system for the computing system 300, and that host operating system may be configured to provide a container 306 or other execution environment that is configured for use in providing the service(s) discussed below. In some of the specific examples provided below, the container 306 may be provided by a "sandbox" or other secure execution environment that is configured to satisfy any of a variety of security requirements for the services, client system(s), and/or entities associated with the host/DPU service provisioning system of the present disclosure, but one of skill in the art in possession of the present disclosure will appreciate how the operating system provided by the operating system engine 304 may be provided by other engines that are configured to provide a variety of execution environments (e.g., a hypervisor configured to provide virtual machine execution environments, etc.) that will fall within the scope of the present disclosure as well. As illustrated in FIG. 3, the operating system engine 304 may also be configured to provide and/or utilize a DPU Application Programming Interface (API) 308, discussed in further detail below. Furthermore, as discussed above, in some embodiments of the present disclosure, the host subsystem 303 may provide client subsystem(s) that operate similarly to the client subsystem(s) 210 described herein.

In the illustrated embodiment, the board 303a of the host subsystem 303 may support a load monitor 310 that, as discussed below, is configured to monitor an operating load of the host subsystem 303 that may be associated with the operation of any of a variety of components included on or coupled to the host subsystem 303. As such, the load monitor 310 may be coupled to the host processing system that provides the operating system engine 304, the host memory system that provides the operating system engine 304, and/or any other "host" components that are included on the board 303a and/or coupled to the host subsystem 303. To provide a specific example, the load monitor 310 may be coupled to Field Programmable Gate Array (FPGA) devices, Graphics Processing Unit (GPU) devices, and/or any other devices that may be included on the board 303a or coupled to the host subsystem 303 and that may be configured to provide and/or assist in performing the services discussed below. However, while the load monitor 310 is illustrated and described as being provided on the board 303a, one of skill in the art in possession of the present disclosure will appreciate how the load monitor 310 may be coupled to the board 303a while remaining within the scope of the present disclosure as well. Furthermore, while a specific host subsystem 303 has been illustrated and described, one of skill in the art in possession of the present disclosure will appreciate how the host subsystem 303 may include a variety of components and/or component configurations while remaining within the scope of the present disclosure as well.

As also illustrated in FIG. 3, the chassis 302 of the computing system 300 may also house a DPU subsystem 312 may include a board 312a such as, for example, a circuit board that is connected to or otherwise coupled to the motherboard that provides the board 303a of the host subsystem 303 in the computing system 300, although other techniques for providing the DPU subsystem 312 are envisioned as falling within the scope of the present disclosure as well. In the illustrated embodiment, the board 312a of the DPU subsystem 312 may support a DPU processing system (not illustrated, but which may be similar to the processor 102 discussed above with reference to FIG. 1 and may be provided by, for example, a channel controller with a programmable specialized electronic circuit that is configured to provide hardware acceleration of data processing for data-centric computing) and a DPU memory system (not illustrated, but which may be similar to the memory 114 discussed above with reference to FIG. 1) that is coupled to the DPU processing system and that includes instructions that, when executed by the DPU processing system, cause the DPU processing system to provide a DPU engine 314 that is configured to perform the functionality of the DPU engines, DPU subsystems, and/or computing systems discussed below.

As will be appreciated by one of skill in the art in possession of the present disclosure, the DPU subsystem 312 may include Application Specific Integrated Circuits (ASICs), FPGA-based processor(s), System on Chip (SOC)-based processor(s), and/or other processors that may provide the DPU processing system discussed above, and may include or be coupled to a Network Interface Controller (NIC), programmable data acceleration subsystems, and/or other DPU components that allow the DPU subsystem 312 to be generally programmed similarly as CPUs while being configured to operate relatively more efficiently than CPUs on networking data packets, storage requests, analytics requests, and/or data that would be apparent to one of skill in the art in possession of the present disclosure. As such, the DPU engine 314 may be distinguished from CPU engines like the operating system engine 304 discussed above via its ability to provide a relatively larger degree of parallelism (e.g., used to process a plurality of service requests and/or other data requests at substantially the same time), while being distinguished from GPUs via its use of a Multiple Instruction, Multiple Data (MIMD) architecture as opposed to the Single Instruction/Multiple Data (SIMD) architectures used by GPUS.

In another example, the DPU subsystem 312 may provide a "smaller" computer inside a "larger" computer (e.g., the server device discussed above), and may be configured to provide additional resources and specialized capabilities relative to the larger computer/server device. In some specific examples, those specialized capabilities may make use of novel software algorithms and/or HW components (e.g., ASICs) that are not generally available to the host. However, in other specific examples, a DPU subsystem without specialized capabilities may be utilized to offload services from host resources while under heavy load while remaining within the scope of the present disclosure as well. In yet other specific examples, a DPU subsystem may be provided by a computing sub-system (e.g., in a server device) that is not directly accessible by applications run by the host subsystem and that is designed to provide a specific set of capabilities and services. However, while specific configurations and/or functionality of DPU subsystems that may be utilized in the host/DPU service provisioning system of the present disclosure have been described, one of skill in the art in possession of the present disclosure will appreciate how the DPU subsystem 312 may include other configurations and/or functionality while remaining within the scope of the present disclosure as well.

As will be appreciated by one of skill in the art in possession of the present disclosure, the DPU engine 314 may be configured to provide a container 316 or other execution environment that is configured for use in providing the service(s) discussed below. In some of the specific examples provided below, the container 316 may be provided by a "sandbox" or other secure execution environment that is configured to satisfy any of a variety of security requirements for the services, client system(s), and/or entities associated with the host/DPU service provisioning system of the present disclosure, but one of skill in the art in possession of the present disclosure will appreciate how the DPU engine 314 may be provided by other engines that are configured to provide a variety of execution environments (e.g., a hypervisor configured to provide virtual machine execution environments, etc.) that will fall within the scope of the present disclosure as well. As illustrated in FIG. 3, the DPU engine 314 may also be configured to provide and/or utilize a service proxy 318, discussed in further detail below, which may be instantiated in response to receiving a service request to provide a service, provided or otherwise available prior to receiving a service request to provide a service, and/or provided or otherwise available using a variety of techniques that would be available to one of skill in the art in possession of the present disclosure. As illustrated in FIG. 3, the operating system engine 304 may be coupled to and/or configured to communicate with the service proxy 318 via the DPU API 308, although other techniques for enabling the operating system engine/service proxy communications discussed below are envisioned as falling within the scope of the present disclosure as well. Furthermore, as discussed above, in some embodiments of the present disclosure, the DPU subsystem 312 may provide client subsystem(s) that operate similarly to the client subsystem(s) 210 described herein.

In the illustrated embodiment, the board 312a of the DPU subsystem 312 may support a load monitor 320 that, as discussed below, is configured to monitor an operating load of the DPU subsystem 312 that may be associated with the operation of any of a variety of components included on or coupled to the DPU subsystem 312. As such, the load monitor 320 may be coupled to the DPU processing system that provides the DPU engine 314, the DPU memory system that provides the DPU engine 314, and/or any other "DPU" components that are included on the board 312a and/or coupled to the DPU subsystem 312. To provide a specific example, the load monitor 320 may be coupled to ASIC devices, Field Programmable Gate Array (FPGA) devices, SoC devices, Graphics Processing Unit (GPU) devices, other processors/processor cores, and/or any other devices that may be included on the board 312a or coupled to the DPU subsystem 312 and that may be configured to provide and/or assist in performing the services discussed below. However, while the load monitor 320 is illustrated and described as being provided on the board 312a, one of skill in the art in possession of the present disclosure will appreciate how the load monitor 320 may be coupled to the board 312a while remaining with within the scope of the present disclosure as well.

As illustrated in FIG. 3, the DPU memory system discussed above may include instructions that, when executed by the DPU processing system, cause the DPU processing system to provide a service orchestrator engine 322 that is coupled to the service proxy 318 and that is configured to perform the functionality of the service orchestrator engines, DPU subsystems, and/or computing systems discussed below. As illustrated, the service orchestrator engine 322 may be coupled to the load monitor 310 for the host subsystem 303 and the load monitor 320 for the DPU subsystem 312 (e.g., via a coupling between the load monitors 310 and 320 and the DPU processing system). However, while a specific DPU subsystem 312 has been illustrated and described, one of skill in the art in possession of the present disclosure will appreciate how the DPU subsystem 312 may include a variety of components and/or component configurations while remaining within the scope of the present disclosure as well.

The chassis 302 of the computing system 300 may also house a communication system 324 that is coupled to the service proxy 318 and the service orchestrator engine 322 (e.g., via a coupling between the communication system 324 and the DPU processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while illustrated as separate from the host subsystem 303 and DPU subsystem 312, one of skill in the art in possession of the present disclosure will appreciate that the communication system 324 may be provided by any network connection/coupling mechanisms in the host subsystem 303 and/or DPU subsystem 312 (e.g., for coupling the host subsystem 303 and/or DPU subsystem 312 to the resource systems 206a-206c) while remaining within the scope of the present disclosure as well. Furthermore, while a specific computing system 300 has been illustrated and described, one of skill in the art in possession of the present disclosure will recognize that computing systems (or other devices operating according to the teachings of the present disclosure in a manner similar to that described below for the computing system 300) may include a variety of components and/or component configurations for providing conventional computing device functionality, as well as the functionality discussed below, while remaining within the scope of the present disclosure as well.

Figure 4:
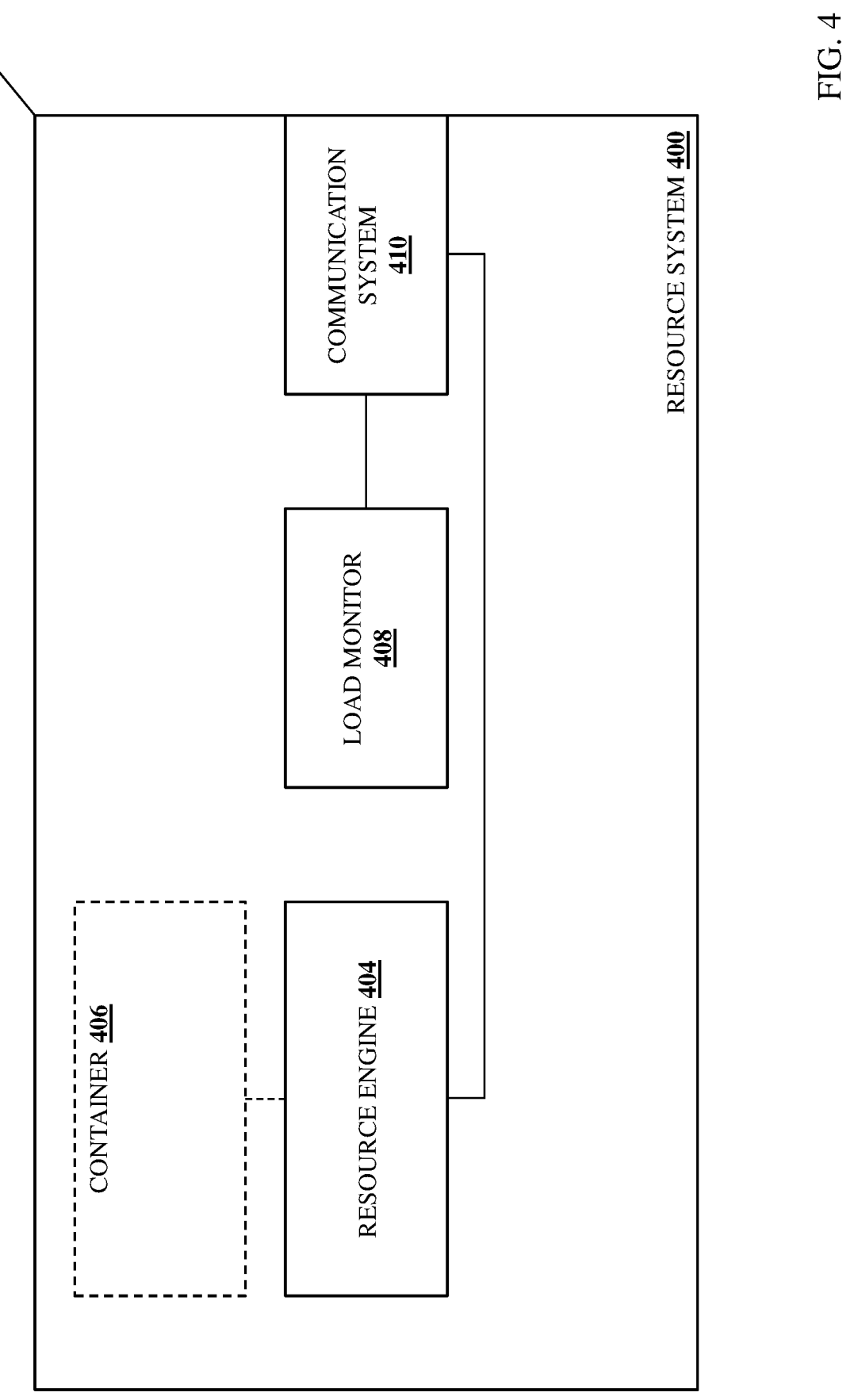
FIG. 4 is a schematic view illustrating an embodiment of a resource system that may be included in the networked system of FIG. 2.

Referring now to FIG. 4, an embodiment of a resource system 400 is illustrated that may provide any or each of the resource systems 206a-206c discussed above with reference to FIG. 2. As such, the resource system 400 may be provided by the IHS 100 discussed above with reference to FIG. 1 and/or may include some or all of the components of the IHS 100, and in specific examples may be provided by server devices or other computing systems that provide "remote hosts" that would be apparent to one of skill in the art in possession of the present disclosure, network-connected hardware accelerator devices, network-connected memory systems, network-connected storage systems, and/or any other network-connected resource systems that would be apparent to one of skill in the art in possession of the present disclosure.

However, while described as being provided by particular network-connected resource systems, one of skill in the art in possession of the present disclosure will recognize that the resource systems of the present disclosure may be provided by any resource systems that may be configured to operate similarly as the resource system 300 discussed below. Furthermore, while illustrated and described in the examples below as being coupled to the computing system 202 via a network, one of skill in the art in possession of the present disclosure will appreciate how the resource system 400 may be directly connected to the computing system 202 without out the use of a network (e.g., as a "stand-alone" device cabled directly to the computing system 202) while remaining within the scope of the present disclosure as well.

In the illustrated embodiment, the resource system 400 includes a chassis 402 that houses the components of the resource system 404, only some of which are illustrated and described below. For example, the chassis 402 may house a resource processing system (not illustrated, but which may include the processor 102 discussed above with reference to FIG. 1) and a resource memory system (not illustrated, but which may include the memory 114 discussed above with reference to FIG. 1) that is coupled to the resource processing system and that includes instructions that, when executed by the resource processing system, cause the resource processing system to provide a resource engine 404 that is configured to perform the functionality of the resource engines and/or resource system discussed below.

As will be appreciated by one of skill in the art in possession of the present disclosure, the resource engine 404 may be configured to provide a container 406 or other execution environment that is configured for use in providing the service(s) discussed below. In some of the specific examples provided below, the container 406 may be provided by a "sandbox" or other secure execution environment that is configured to satisfy any of a variety of security requirements for the services, client system(s), and/or entities associated with the host/DPU service provisioning system of the present disclosure, but one of skill in the art in possession of the present disclosure will appreciate how the resource engine 404 may be provided by other engines that are configured to provide a variety of execution environments (e.g., a hypervisor configured to provide virtual machine execution environments, etc.) that will fall within the scope of the present disclosure as well.

In the illustrated embodiment, the chassis 402 may house a load monitor 408 that, as discussed below, is configured to monitor an operating load of the resource system 400 that may be associated with the operation of any of a variety of components included on or coupled to the resource system 400. As such, the load monitor 408 may be coupled to the resource processing system that provides the resource engine 404, the resource memory system that provides the resource engine 404, and/or any other "resource" components that are included in the resource system 400. To provide a specific example, the load monitor 408 may be coupled to x86 processors or other CPU devices, FPGA devices, GPU devices, and/or any other devices that may be included in the resource system 400 and that may be configured to provide and/or assist in performing the services discussed below. However, while the load monitor 408 is illustrated and described as being provided in the resource system 400, one of skill in the art in possession of the present disclosure will appreciate how the load monitor 408 may be coupled to the resource system 400 while remaining with within the scope of the present disclosure as well.

The chassis 402 may also house a communication system 410 that is coupled to the load monitor 408 and the resource engine 404 (e.g., via a coupling between the communication system 308 and the resource processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific resource system 400 has been illustrated and described, one of skill in the art in possession of the present disclosure will appreciate how resource system 400 may include a variety of components and/or component configurations while remaining within the scope of the present disclosure as well.

Figure 5A:
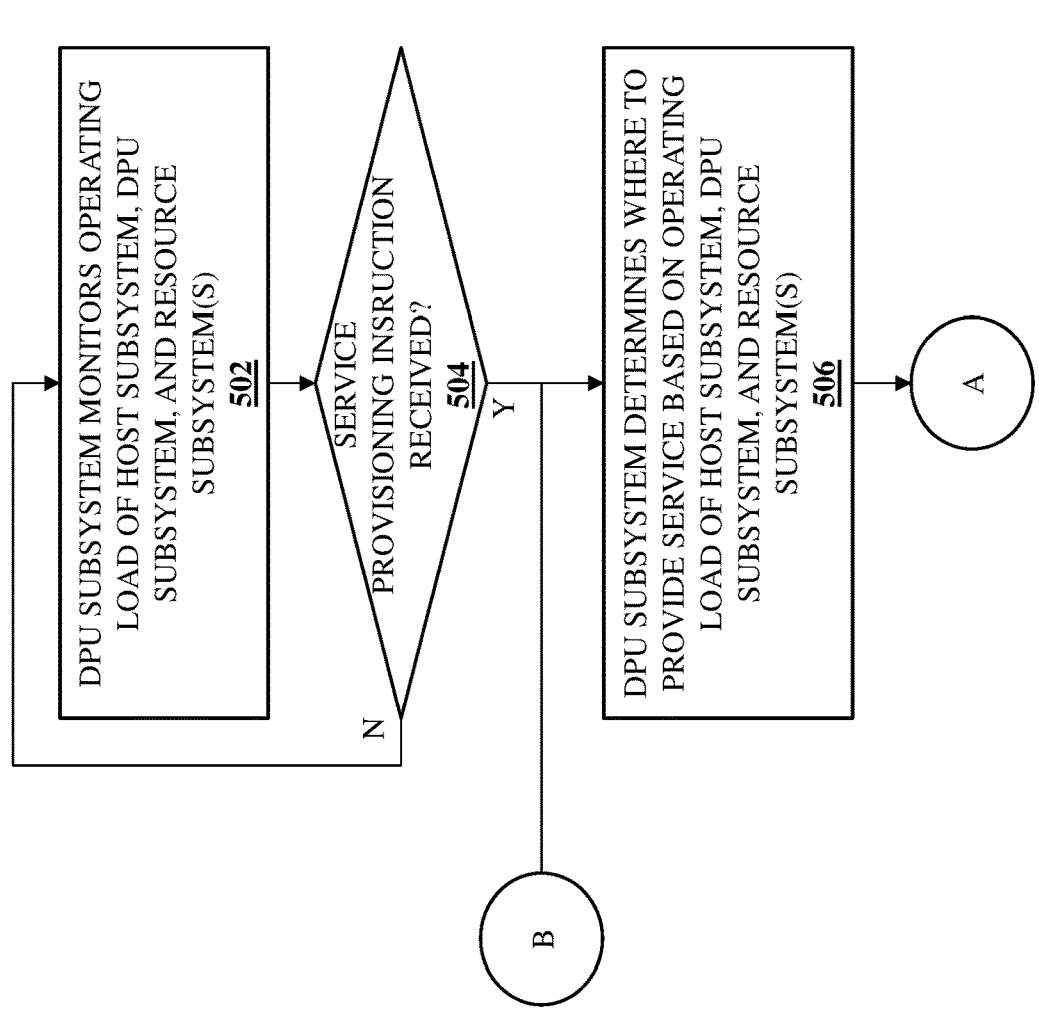
FIG. 5A is a flow chart illustrating an embodiment of a portion of a method for providing services using a host subsystem and a DPU subsystem.
Figure 5B:
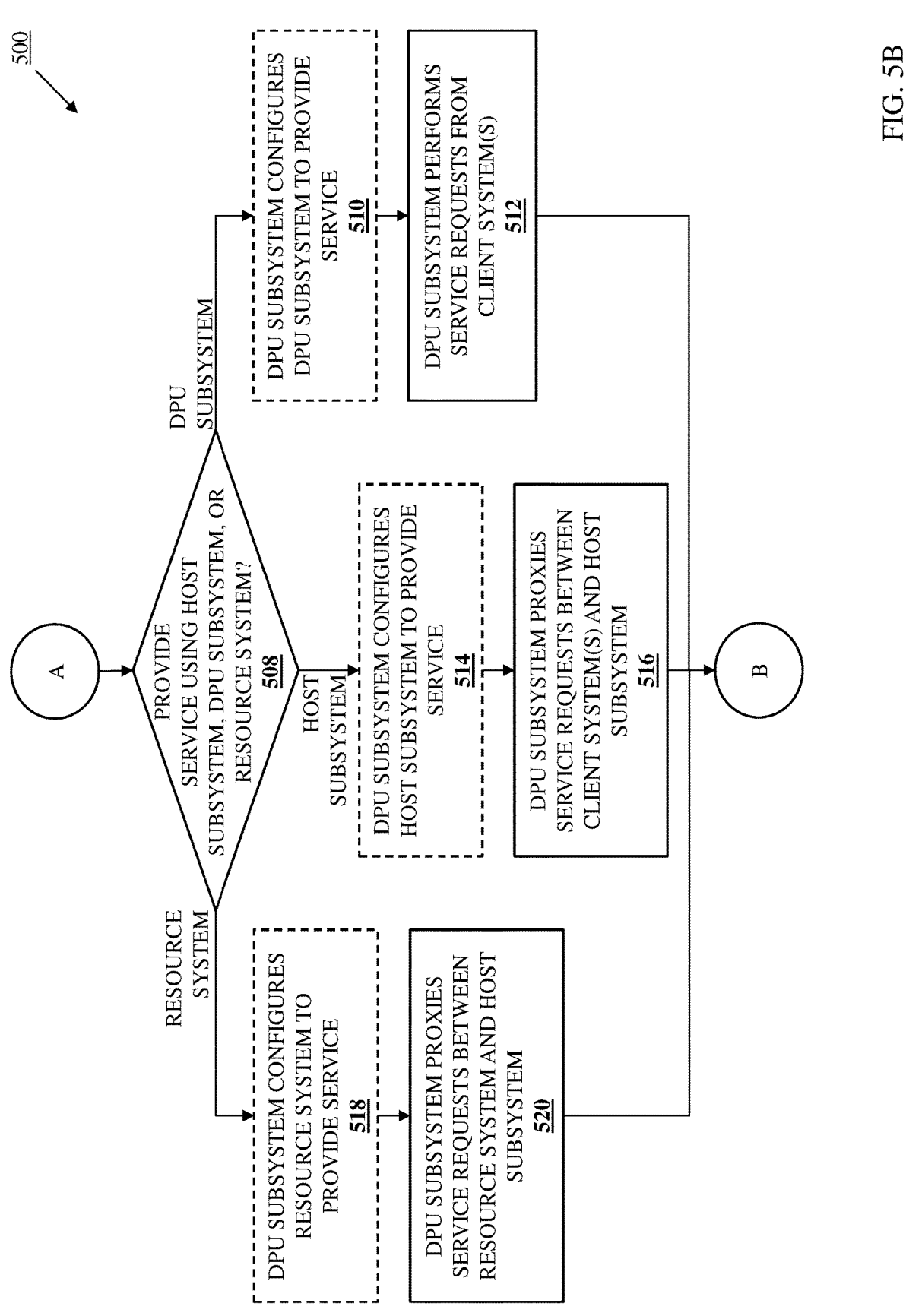
FIG. 5B is a flow chart illustrating an embodiment of a portion of a method for providing services using a host subsystem and a DPU subsystem.

Referring now to FIGS. 5A and 5B, an embodiment of a method 500 for providing services using a host subsystem and a Data Processing Unit (DPU) subsystem is illustrated. As discussed below, the systems and methods of the present disclosure provide a service for client system(s) via a host subsystem and/or a DPU subsystem using a DPU subsystem that is configured to identify where the service should be provided based on operating loads of the host subsystem and the DPU subsystem, and either perform service requests from the client system(s), or proxy service requests between the client system(s) and the host subsystem. For example, a computing system provided according to the teachings of the present disclosure may include a DPU subsystem coupled to a host subsystem. The DPU subsystem receives an instruction to provide a service, and determines a host operating load of the host subsystem and a DPU operating load of the DPU subsystem during subsequent time periods. Based on the host operating load and/or the DPU operating load during a first time period, the DPU subsystem configures the DPU subsystem to provide the service, and performs service requests for the service from client system(s). Based on the host operating load and/or the DPU operating load during a second time period that is subsequent to the first time period, the DPU subsystem configures the host subsystem to provide the service in order to migrate the service from the DPU subsystem to the host subsystem, and proxies service requests for the service between the client system(s) and the host subsystem providing the service. As such, the ability to allocate computing system resources based on changing operating loads is improved relative to conventional host/DPU service provisioning systems.

Figure 6A:
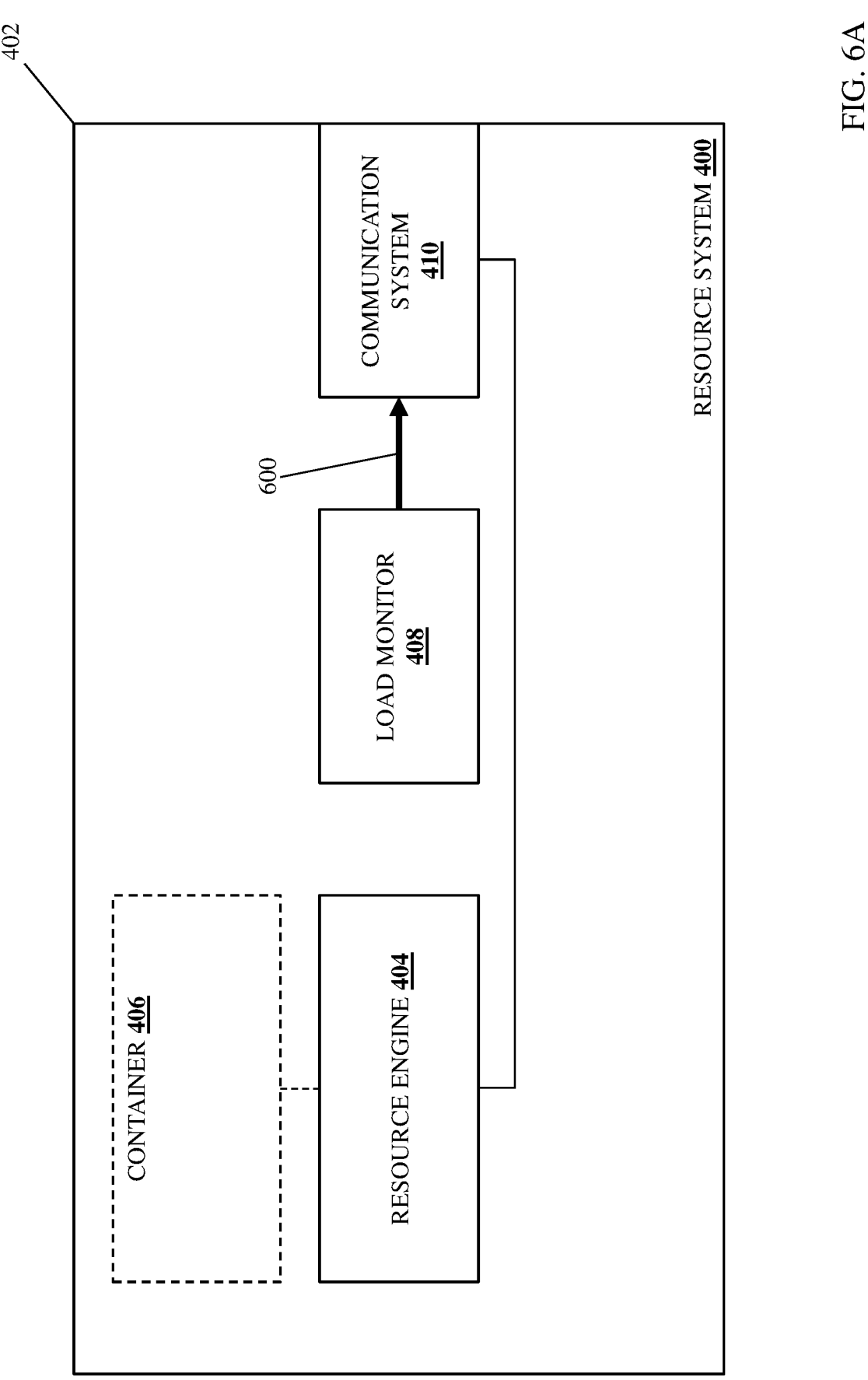
FIG. 6A is a schematic view illustrating an embodiment of the resource system of FIG. 4 operating during the method of FIGS. 5A and 5B.
Figure 6B:
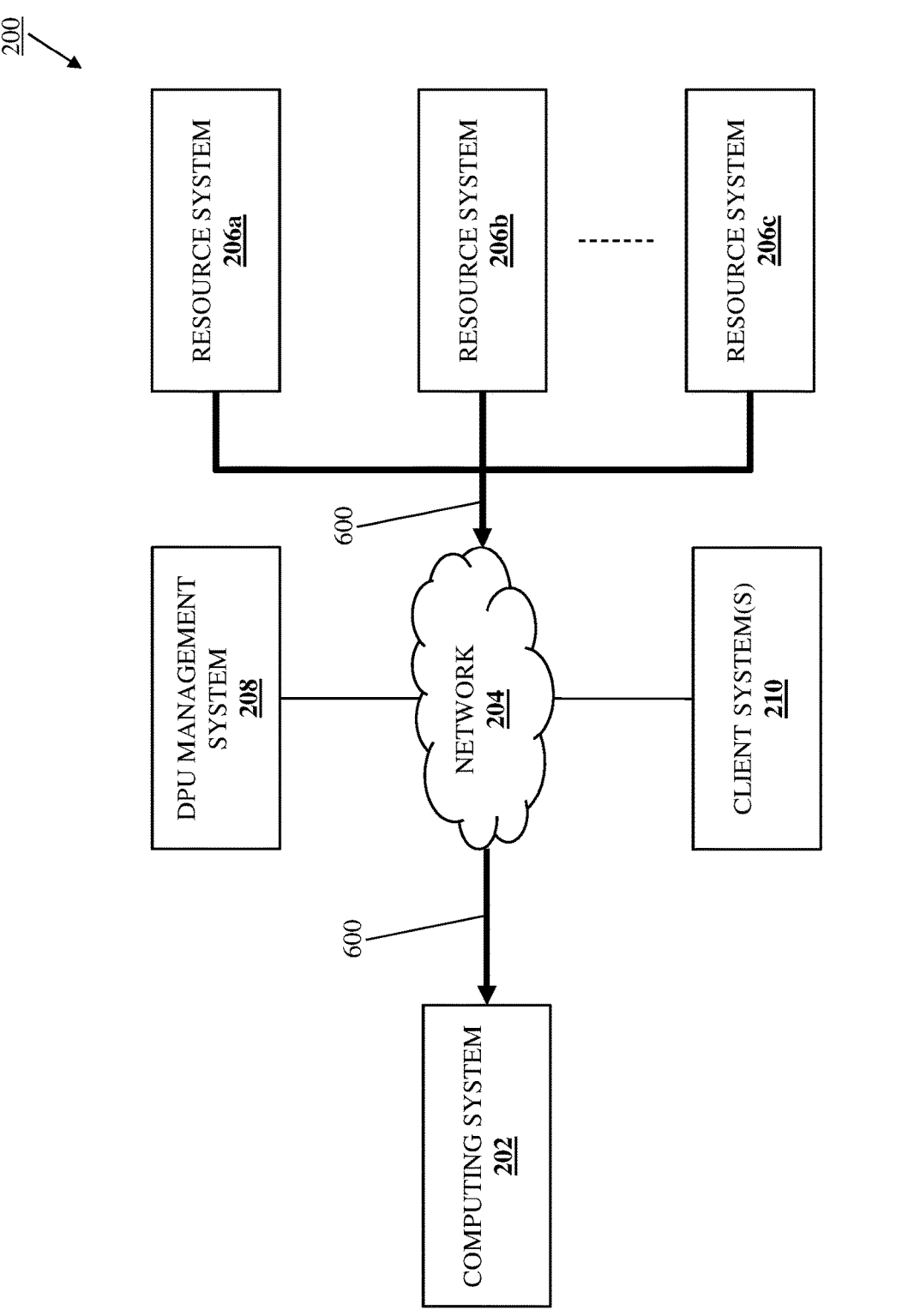
FIG. 6B is a schematic view illustrating an embodiment of the networked system of FIG. 2 operating during the method of FIGS. 5A and 5B.
Figure 6C:
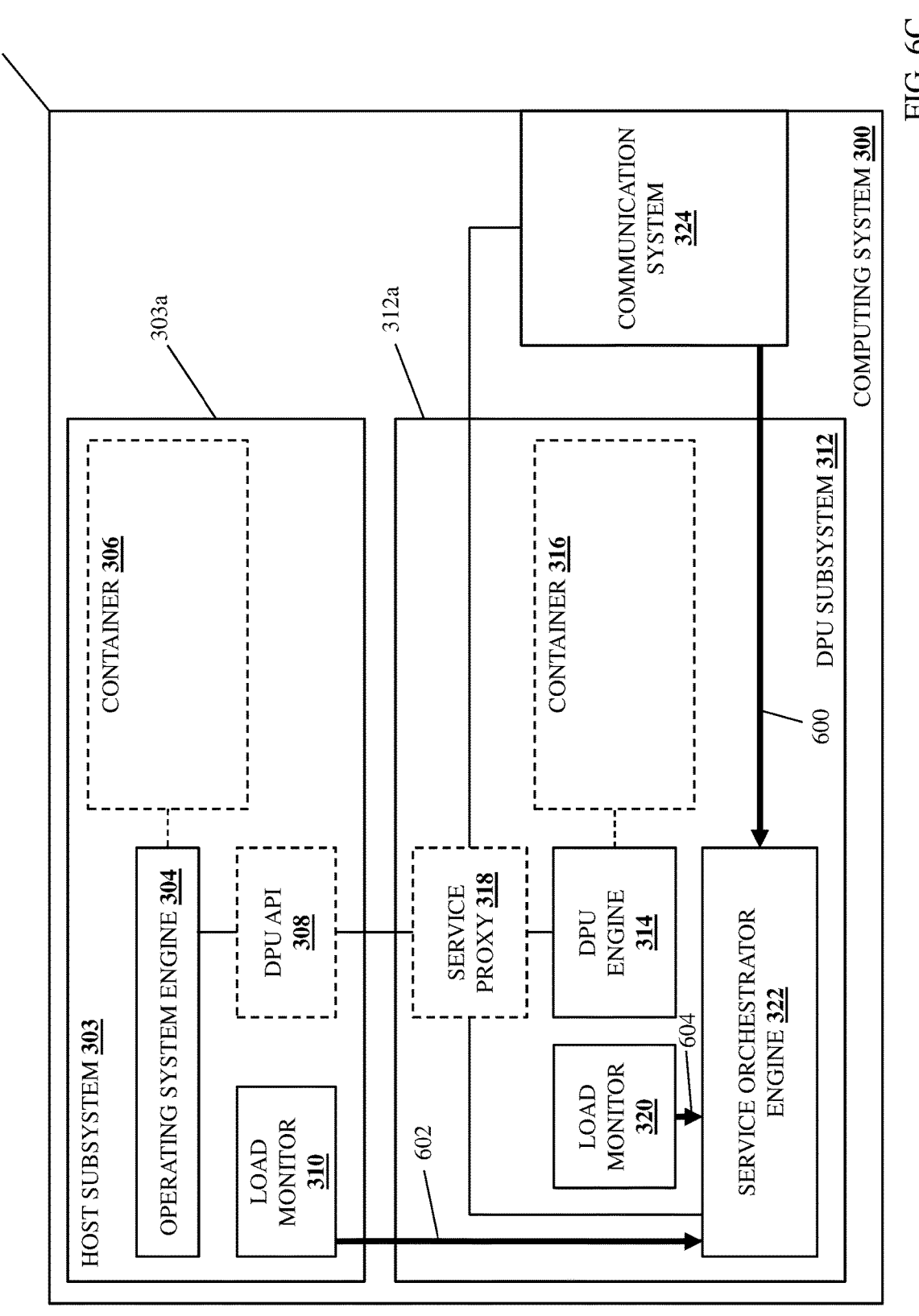
FIG. 6C is a schematic view illustrating an embodiment of the computing system of FIG. 3 operating during the method of FIGS. 5A and 5B.

The method 500 begins at block 502 where a DPU subsystem monitors an operating load of a host subsystem, the DPU subsystem, and one or more resource systems. With reference to FIGS. 6A, 6B, and 6C, in an embodiment of block 502, the service orchestrator engine 322 in the DPU subsystem 312 of the computing system 202/300 may monitor operating loads of the host subsystem 303, the DPU subsystem 312, and the resource systems 206a-206c/400. For example, the load monitor 408 in each of the resource systems 206a-206c/400 may monitor the operating load of one or more components in that resource system 400 (e.g., the resource processing system that provides the resource engine 404, the resource memory system that provides the resource engine 404, and/or any other components in that resource system 400 that may be used to perform services), and may perform resource operating load information transmission operations 600 that may include transmitting resource operating load information for that resource system 400 (e.g., resource component utilization telemetry data and/or other resource operating load information that would be apparent to one of skill in the art in possession of the present disclosure) via its communication system 410 and through the network 204 such that it is received by the service orchestrator engine 322 via the communication system 324 in the computing system 202/300.

Similarly, the load monitor 310 in host subsystem 303 may monitor the operating load of one or more components in host subsystem 303 (e.g., the host processing system that provides the operating system engine 304, the host memory system that provides the operating system engine 304, and/or any other components in that host subsystem 303 that may be used to perform services), and may perform host operating load information transmission operations 602 that may include transmitting host operating load information (e.g., host component utilization telemetry data and/or other host operating load information that would be apparent to one of skill in the art in possession of the present disclosure) to the service orchestrator engine 322.

Similarly, the load monitor 320 in DPU subsystem 312 may monitor the operating load of one or more components in DPU subsystem 312 (e.g., the DPU processing system that provides the DPU engine 314, the DPU memory system that provides the DPU engine 314, and/or any other components in that DPU subsystem 312 that may be used to perform services), and may perform DPU operating load information transmission operations 604 that may include transmitting DPU operating load information (e.g., DPU component utilization telemetry data and/or other DPU operating load information that would be apparent to one of skill in the art in possession of the present disclosure) to the service orchestrator engine 322. As will be appreciated by one of skill in the art in possession of the present disclosure, at block 502 the service orchestrator engine 322 in the DPU subsystem 312 of the computing system 202/300 may utilize the host operating load information, the DPU operating load information, and the resource operating load information in order to monitor the operating loads of the host subsystem 303, the DPU subsystem 312, and the resource systems 206a-206c/400.

The method 500 then proceeds to decision block 504 where it is determined whether a service provisioning instruction has been received. In an embodiment, at decision block 504, the service orchestrator engine 322 in the DPU subsystem 312 of the computing system 202/300 may determine whether a service provisioning instruction has been received. As discussed below, the DPU management engine 208 may be configured to receive requests from any of the client system(s) 210 for services such as the performance of storage protocols, networking protocols, storage protocols, encryption/decryption, compression/decompression, video/ audio encoding/decoding, Artificial Intelligence/Machine Learning model inferencing, data movement, data migration, data transformation, and/or other services that would be apparent to one of skill in the art in possession of the present disclosure. Furthermore, the DPU management engine 208 may be configured to receive requests from client system(s) provided by the host subsystem 303 and/or the DPU subsystem 312 in the computing system 202/300. In response to receiving a request for services, the DPU management engine 208 may identify DPU subsystems in computing systems that should provide those services, and then generate and transmit service provisioning instructions to those DPU subsystems to provide those services. As such, the service orchestrator engine 322 may monitor for such service provisioning instructions at decision block 504. However, while a specific example of the provisioning of an instruction to a DPU subsystem to provide a service has been described, one of skill in the art in possession of the present disclosure will appreciate how other techniques to provide services using DPU subsystems will fall within the scope of the present disclosure as well.

If, at decision block 504, it is determined that a service provisioning instruction has not been received, the method 500 returns to block 502. As such, the method 500 may loop such that the service orchestrator engine 322 in the DPU subsystem 312 of the computing system 202/300 continues to receive and utilize the host operating load information, the DPU operating load information, and the resource operating load information discussed above with reference to block 502 in order to monitor the operating loads of the host subsystem 303, the DPU subsystem 312, and the resource systems 206a-206c/400. Furthermore, while the receiving and utilization of the host operating load information, the DPU operating load information, and the resource operating load information to monitor the operating loads of the host subsystem 303, the DPU subsystem 312, and the resource systems 206a-206c/400 is illustrated and described as being performed prior to the receiving of a service provisioning instruction, one of skill in the art in possession of the present disclosure will appreciate that the receiving and utilization of the host operating load information, the DPU operating load information, and the resource operating load information to monitor the operating loads of the host subsystem 303, the DPU subsystem 312, and the resource systems 206a-206c/400 may be performed throughout the method 500 while remaining within the scope of the present disclosure as well.

Figure 7A:
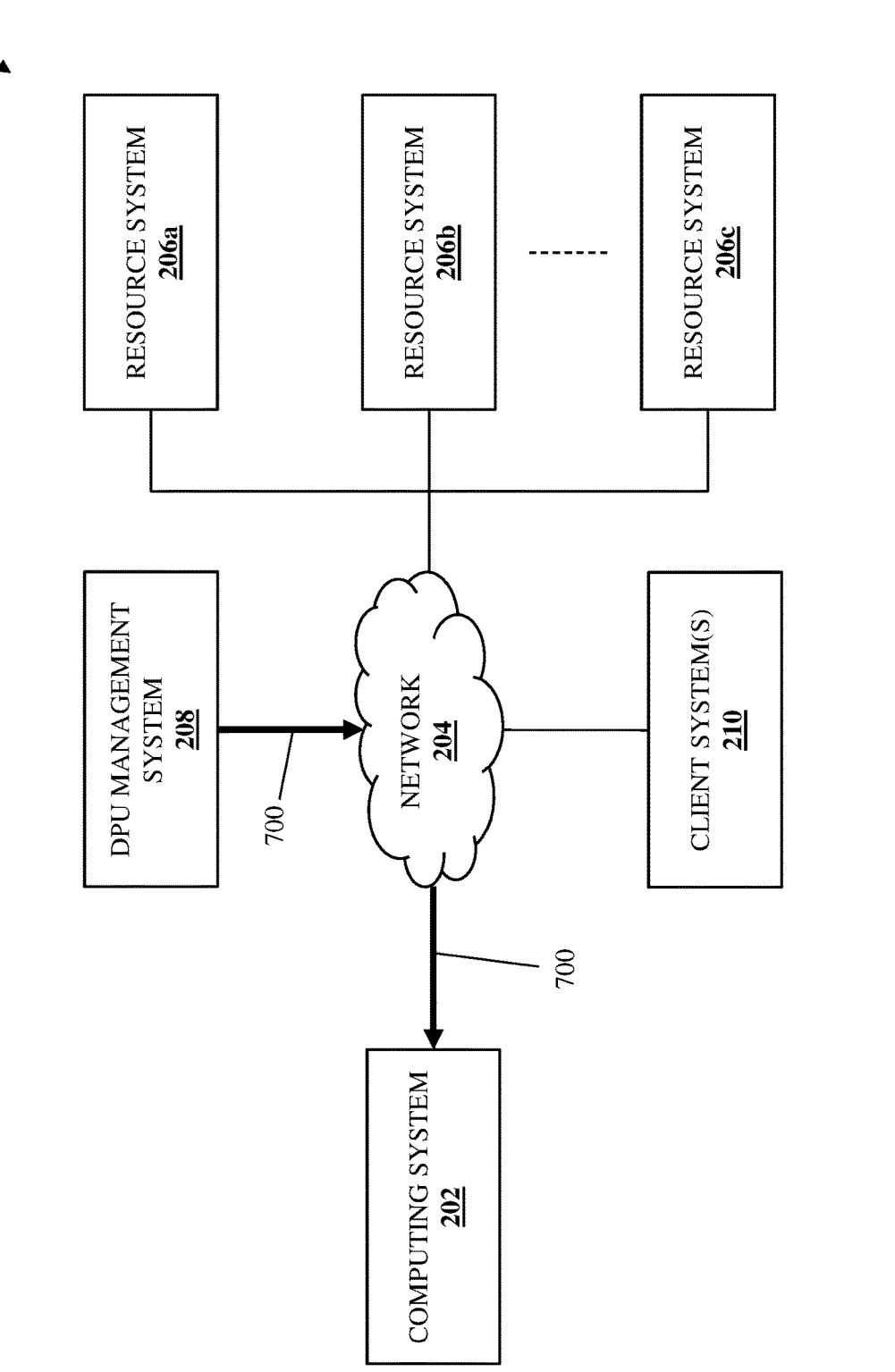
FIG. 7A is a schematic view illustrating an embodiment of the networked system of FIG. 2 operating during the method of FIGS. 5A and 5B.
Figure 7B:
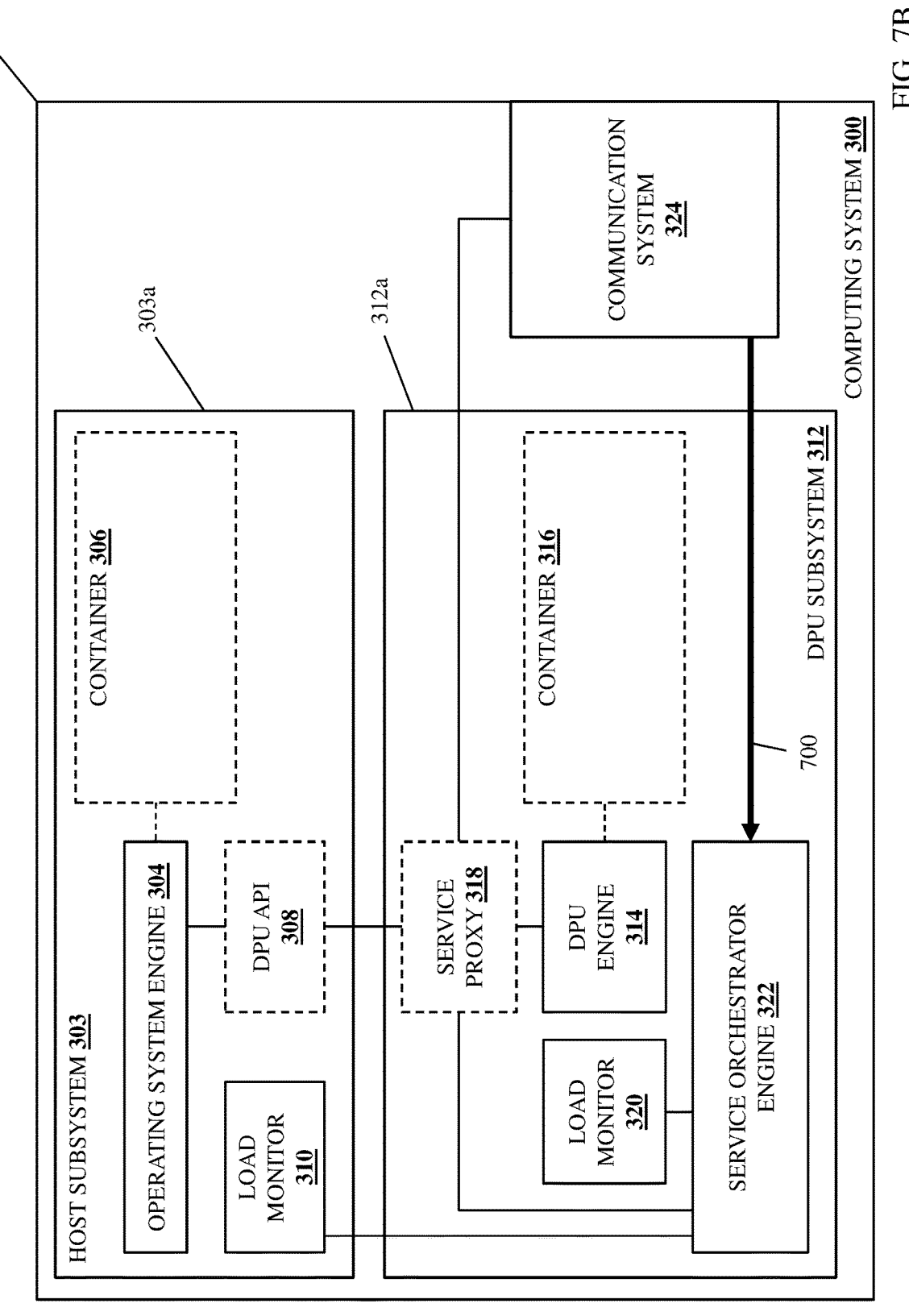
FIG. 7B is a schematic view illustrating an embodiment of the computing system of FIG. 3 operating during the method of FIGS. 5A and 5B.

If, at decision block 504, it is determined that a service provisioning request has been received, the method 500 proceeds to block 506 where the DPU subsystem determines where to provide a service based on the operating load of the host subsystem, the DPU subsystem, and the resource system(s). With reference to FIGS. 7A and 7B, in an embodiment of decision block 504, the DPU management system 208 may perform service provisioning instruction transmission operations 700 that may include generating and transmitting a service provisioning instruction via the network 204 such that it is received by the service orchestrator engine 322 via the communication system 324 on the computing system 202/300. For example, the DPU management system 208 may determine that one of more of the client system(s) 210 require a service (or that client system(s) provided by the host subsystem 303 and/or DPU subsystem 312 in the computing system 202/300 require a service), identify the DPU subsystem 312 in the computing system 202/300 as being configured or otherwise capable of providing the service and, in response, may generate and transmit the service provisioning instruction to the service orchestrator engine 322 in the DPU subsystem 312.

In a specific example, the service associated with the service provision instruction may include a plurality of microservices that are configured to be performed to provide a service, and thus the performance of a service as described herein may include the performance of constituent microservices for a service in some embodiments. Furthermore, the service may include one or more service provisioning requirements that describes service levels that should be satisfied when performing the service such as, for example, service bandwidth provisioning requirements, service latency provisioning requirements, service storage requirements, service cost requirements, service power requirements, service availability requirements, service performance requirements, service scalability requirements, service affinity requirements, service mobility requirements, service migration requirements, and/or any other service provisioning requirements that would be apparent to one of skill in the art in possession of the present disclosure. As such, one of skill in the art in possession of the present disclosure will appreciate how the service provisioning instruction may detail or otherwise identify any of the service provisioning requirements discussed above. However, while a specific example of providing a service provisioning instruction to a DPU subsystem has been described, one of skill in the art in possession of the present disclosure will appreciate how DPU subsystems may be instructed to provide a service in other manners that will fall within the scope of the present disclosure as well.

In an embodiment, at block 506 and in response to receiving the service provisioning instruction, the service orchestrator engine 322 may use host service capability information for the host subsystem 303 that identifies the service provisioning capabilities of the host subsystem 303, DPU service capability information for the DPU subsystem 312 that identifies the service provisioning capabilities of the DPU subsystem 312, and resource service capability information for the resource system(s) 206a-206c/400 that identifies the service provisioning capabilities of the resource system(s) 206a-206c/400, in order to determine any of the host subsystem 303, the DPU subsystem 312, and the resource system(s) 206a-206c/400 that are capable of satisfying the service provisioning requirements of the service.

For example, the host service capability information, the DPU service capability information, and the resource service capability information may have been provided to the service orchestrator engine 322 prior to the method 500, received during the method 500 (e.g., from the load monitors 310, 320, and 408 at block 502), and/or otherwise provided to the service orchestrator engine 322 using other techniques that would be apparent to one of skill in the art in possession of the present disclosure. As such, while the embodiment of the method 500 described below provides a situation in which each of the host subsystem 303, the DPU subsystem 312, and the resource system(s) 206a-206c/400 are capable of satisfying the service provisioning requirements of the service, one of skill in the art in possession of the present disclosure will appreciate how any of the host subsystem 303, the DPU subsystem 312, and the resource system(s) 206a-206c/400 may be excluded from providing the service in the event they are not capable of satisfying the service provisioning requirements of the service.

In an embodiment of block 506, the service orchestrator engine 322 in the DPU subsystem 312 of the computing system 202/300 then determines where to provide the service based on the operating loads of the host subsystem 303, the DPU subsystem 312, and the resource systems 206a-206c/400 (which as discussed above, may be identified using the host operating load information, the DPU operating load information, and the resource operating load information received as discussed above with reference to block 502). For example, in some embodiments, the best service performance for the service may be provided by the host subsystem 303 when the host subsystem is experiencing a relatively "light" host operating load (e.g., when the host subsystem is not fully utilized), while the best service performance for the service may be provided by the DPU subsystem 312 or the resource system(s) 206a-206c/400 when the host subsystem is experiencing a relatively "heavy" host operating load (e.g., when the host subsystem is full utilized).

To provide a specific example, at block 506, the service orchestrator engine 322 in the DPU subsystem 312 of the computing system 202/300 may determine that the host subsystem 303 is experiencing a relatively "light" host operating load (e.g., when the host subsystem is not fully utilized) and, in response, may determine that the service should be provided by the host subsystem 303. In another specific example, at block 506, the service orchestrator engine 322 may determine that the host subsystem 303 is experiencing a relatively "heavy" host operating load (e.g., when the host subsystem is fully utilized) while at least one of the resource system(s) 206a-206c/400 is experiencing a relatively "light" resource operating load (e.g., when the resource system(s) are not fully utilized) and, in response, may determine that the service should be provided by those resource system(s). In another specific example, at block 506, the service orchestrator engine 322 may determine that the host subsystem 303 is experiencing a relatively "heavy" host operating load (e.g., when the host subsystem is fully utilized) and the resource system(s) 206a-206c/400 are experiencing a relatively "heavy" resource operating load (e.g., when the resource system(s) are fully utilized) and, in response, may determine that the service should be provided by the DPU subsystem 312. However, while several specific examples of the determination of where to perform a service have been described, one of skill in the art in possession of the present disclosure will appreciate how different factors may be utilized to determine whether to perform a service while remaining within the scope of the present disclosure as well.

The method 500 then proceeds to decision block 508 where the method 500 proceeds based on where it was determined to provide the service. In the embodiments described below, at decision block 508 the method 500 proceeds depending the one of the host subsystem 303, the DPU subsystem 312, or the resource system 206c/400 the service orchestrator engine 322 in the DPU subsystem 312 of the computing system 202/300 determined should provide the service. However, as discussed below, some embodiments of the method 500 may include the performance of services (or microservices that provide the service instructed at decision block 504) by more than one of the host subsystem 303, the DPU subsystem 312, and the resource systems 206a-206c/400 while remaining within the scope of the present disclosure as well.

Figure 8:
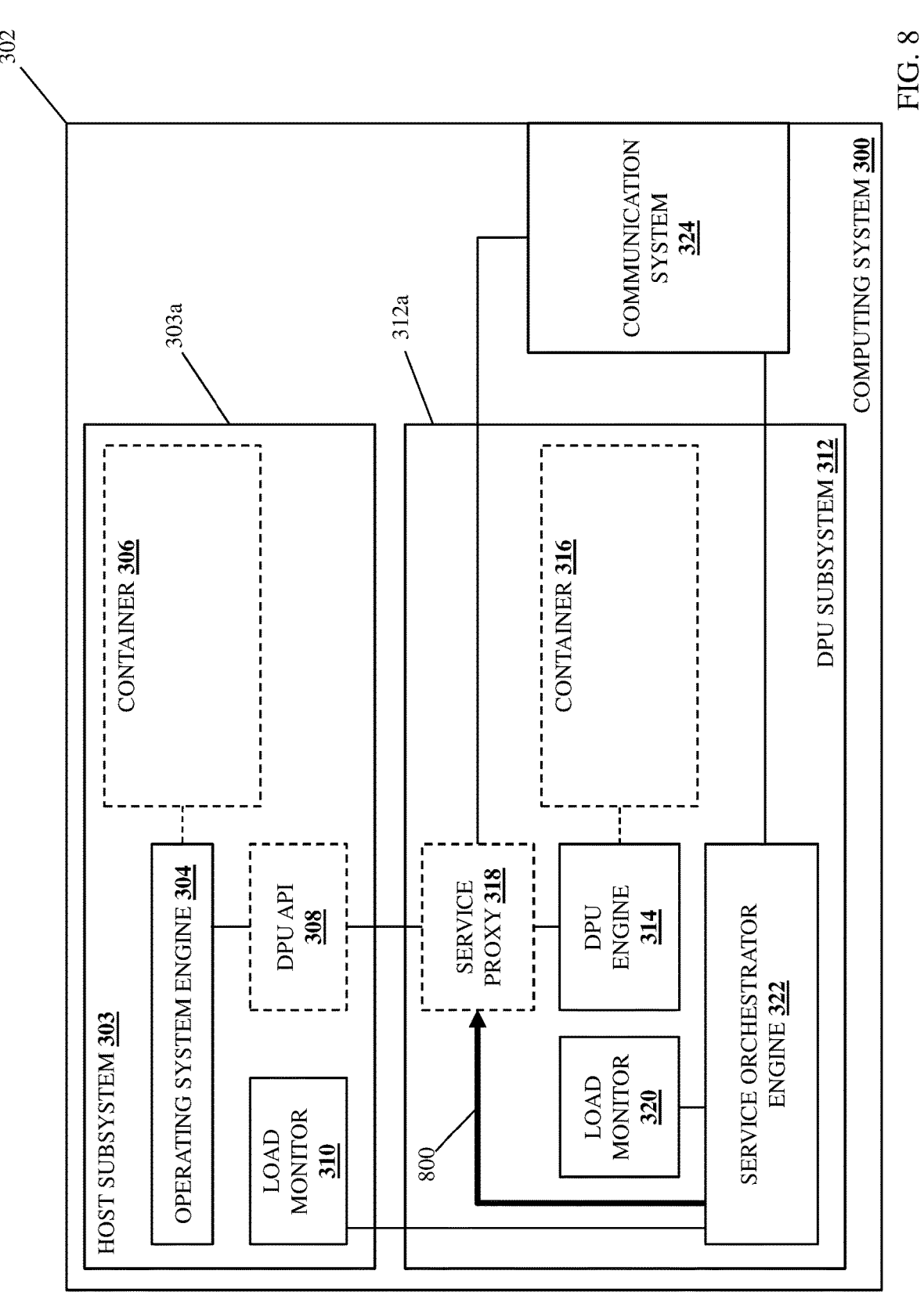
FIG. 8 is a schematic view illustrating an embodiment of the computing system of FIG. 3 operating during the method of FIGS. 5A and 5B.

With reference to FIG. 8, in an embodiment of decision block 508, the service orchestrator engine 322 in the DPU subsystem 312 of the computing system 202/300 may perform service configuration instruction transmission operations 800 that may include generating service configuration instructions that identify the host subsystem 303, the DPU subsystem 312, or the resource system 206a-206c/400 that the service orchestrator engine 322 determined should provide the service, service configuration information for configuring the service, and/or any other information that one of skill in the art in possession of the present disclosure would recognize as allowing the provisioning of the service to be configured as described below. In one specific example, the service configuration information may provide a "portable service executable" (or "portable multi-service/microservice executable") that is configured to be provided in any of the containers 306, 316, or 406 discussed above. For example, the service configuration information may include byte code (e.g., JAVA® byte code, WebAssembly (Wasm) byte code, etc.) that is supported by each of the host subsystem 303, the DPU subsystem 312, and the resource systems 206a-206c/400 (e.g., such that that byte code is executable via the container, sandbox, virtual machine, or other execution environment provided therein).

In another specific example, the service configuration information may be selected based on the host subsystem 303, the DPU subsystem 312, or the resource system 206a-206c/400 that the service orchestrator engine 322 determined should provide the service, and thus for any service, the service orchestration engine 322 may have access to host service configuration information that allows the service to be provided on the host subsystem 303, DPU service configuration information that allows the service to be provided on the DPU subsystem 312, or resource service configuration information that allows the service to be provided on the resource systems 206a-206c/400, respectively. As such, this example provides a "fat" binary option for configuring a service in which that service is associated with multiple pre-compiled service variants that are each configured for use by a respective computing platform (e.g., an x86 processor or CPU, an FPGA, a GPU, etc.) Furthermore, other "fat" binary options may include a number of "thin" binaries that are executable to provide a plurality of relatively smaller services that connect to perform a relatively larger service.

In yet another specific example, the service configuration information may be translated based on the host subsystem 303, the DPU subsystem 312, or the resource systems 206a-206c/400 that the service orchestrator engine 322 determined should provide the service, and thus for any service, the service orchestration engine 322 may include service configuration information that allows the service to be provided on one of the host subsystem 303, the DPU subsystem 312, or the resource systems 206a-206c/400, with the service orchestrator engine 322 configured to translate that service configuration information to provide translated service configuration information that allows the service to be provided on any of the others of the host subsystem 303, the DPU subsystem 312, or the resource systems 206a-206c/400. However, while several specific examples of service configuration information have been described, one of skill in the art in possession of the present disclosure will appreciate how service configuration information may be provided using other techniques that will fall within the scope of the present disclosure as well.

Figure 9:
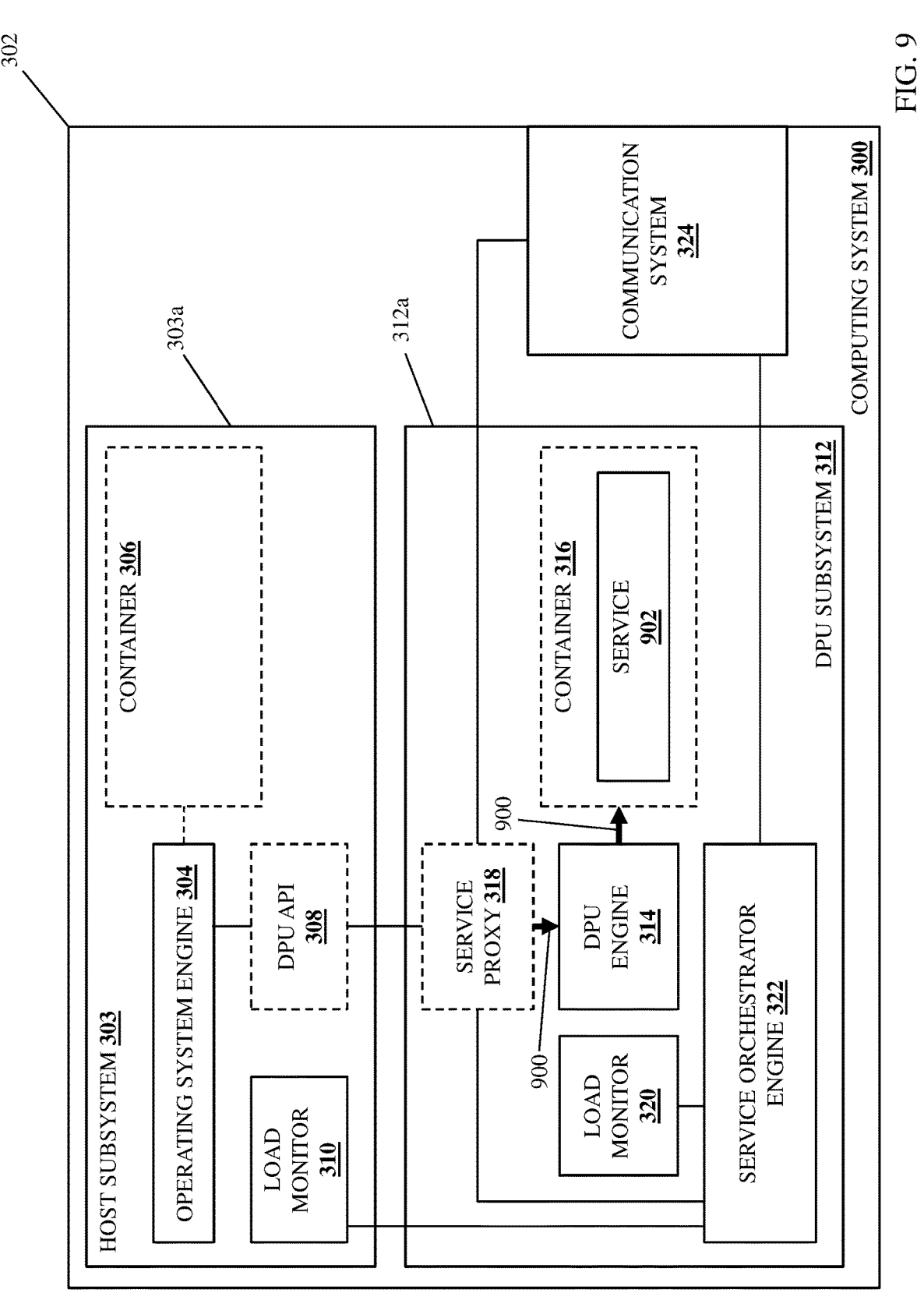
FIG. 9 is a schematic view illustrating an embodiment of the computing system of FIG. 3 operating during the method of FIGS. 5A and 5B.

If, at decision block 508, it was determined to provide the service using the DPU subsystem, the method 500 proceeds to optional block 510 where the DPU subsystem configures the DPU subsystem to provide the service. With reference to FIG. 9, in an embodiment of optional block 510, the service proxy 318 may perform DPU service configuration operations 900 that may include using the service configuration information to configure the DPU engine 314 to provide a service 902 via the container 316. While not illustrated in FIG. 9, following the configuration of the DPU subsystem 312 to provide the service 902, the service proxy 318 may provide a notification to the DPU management system 208, any client system(s) 210 that may have requested the service 802, and/or any other entities associated with the service 902, with that notification identifying that the service 902 is available, identifying that the service proxy 318 provides the service access point for the service 902, and/or identifying any other deployed service information that would be apparent to one of skill in the art in possession of the present disclosure. As will be appreciated by one of skill in the art in possession of the present disclosure, optional block 510 may be performed to initially configure the DPU subsystem 312 to provide the service 902, after which optional block 510 may be skipped as long as the DPU subsystem 312 is providing the service 902.

Figure 10A:
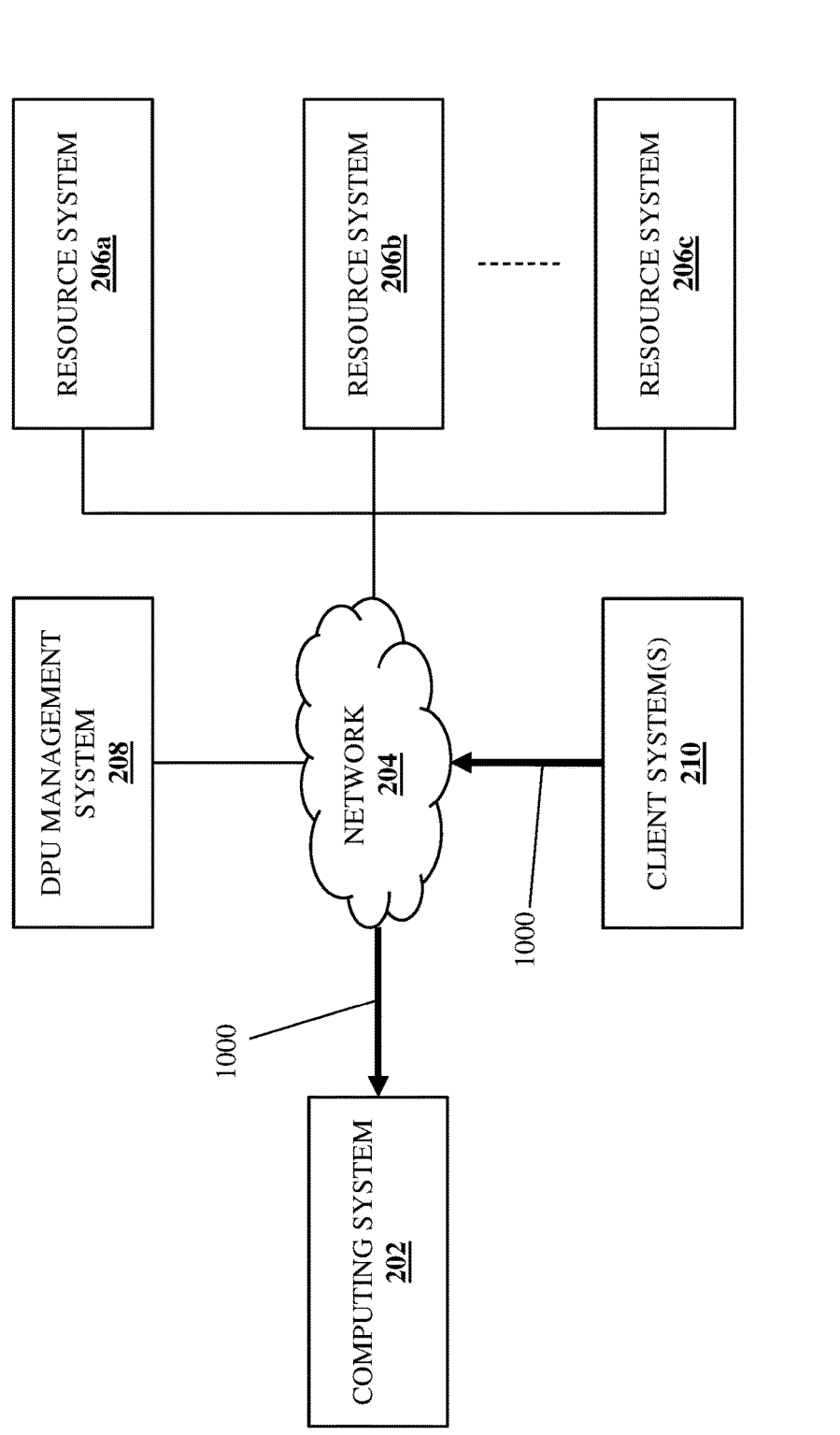
FIG. 10A is a schematic view illustrating an embodiment of the networked system of FIG. 2 operating during the method of FIGS. 5A and 5B.
Figure 10B:
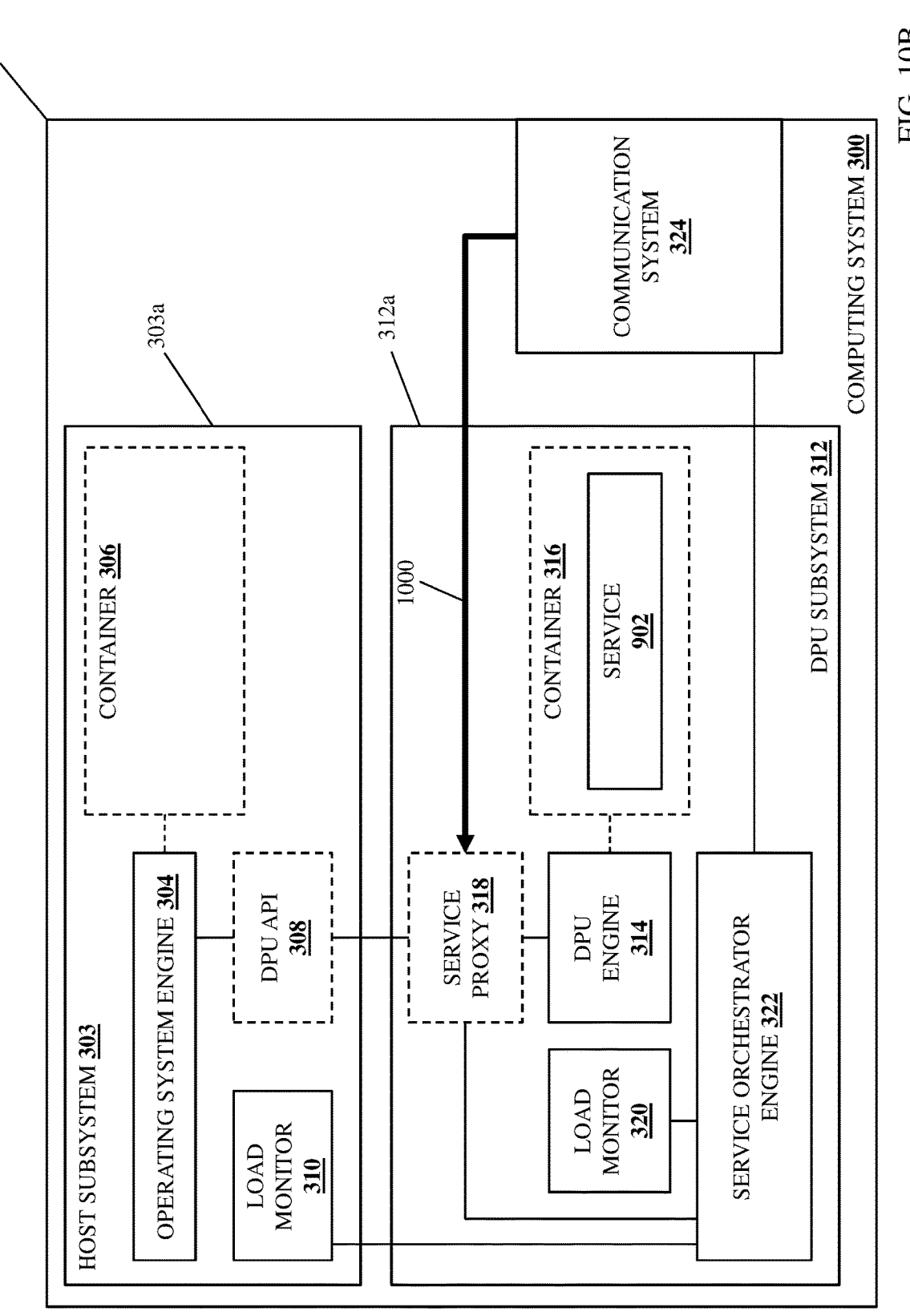
FIG. 10B is a schematic view illustrating an embodiment of the computing system of FIG. 3 operating during the method of FIGS. 5A and 5B.

The method 500 then proceeds to block 512 where the DPU subsystem performs service requests from one or more client systems. With reference to FIGS. 10A and 10B, in an embodiment of block 512, the client system(s) 210 (or client subsystem(s) provided by the host subsystem 303 and/or DPU subsystem 312 in the computing device 202/300) may perform service request transmission operations 1000 that include generating and transmitting a service request to the DPU subsystem 312 in the computing system 202/300 via the network 204 such that it is received by the service proxy 318 in the DPU subsystem 312 of the computing system 202/300. As will be appreciated by one of skill in the art in possession of the present disclosure, the service request received at block 512 may identify the service 902, a request to perform one or more service operation associated with the service, and/or any other service request information that would be apparent to one of skill in the art in possession of the present disclosure.

Figure 11:
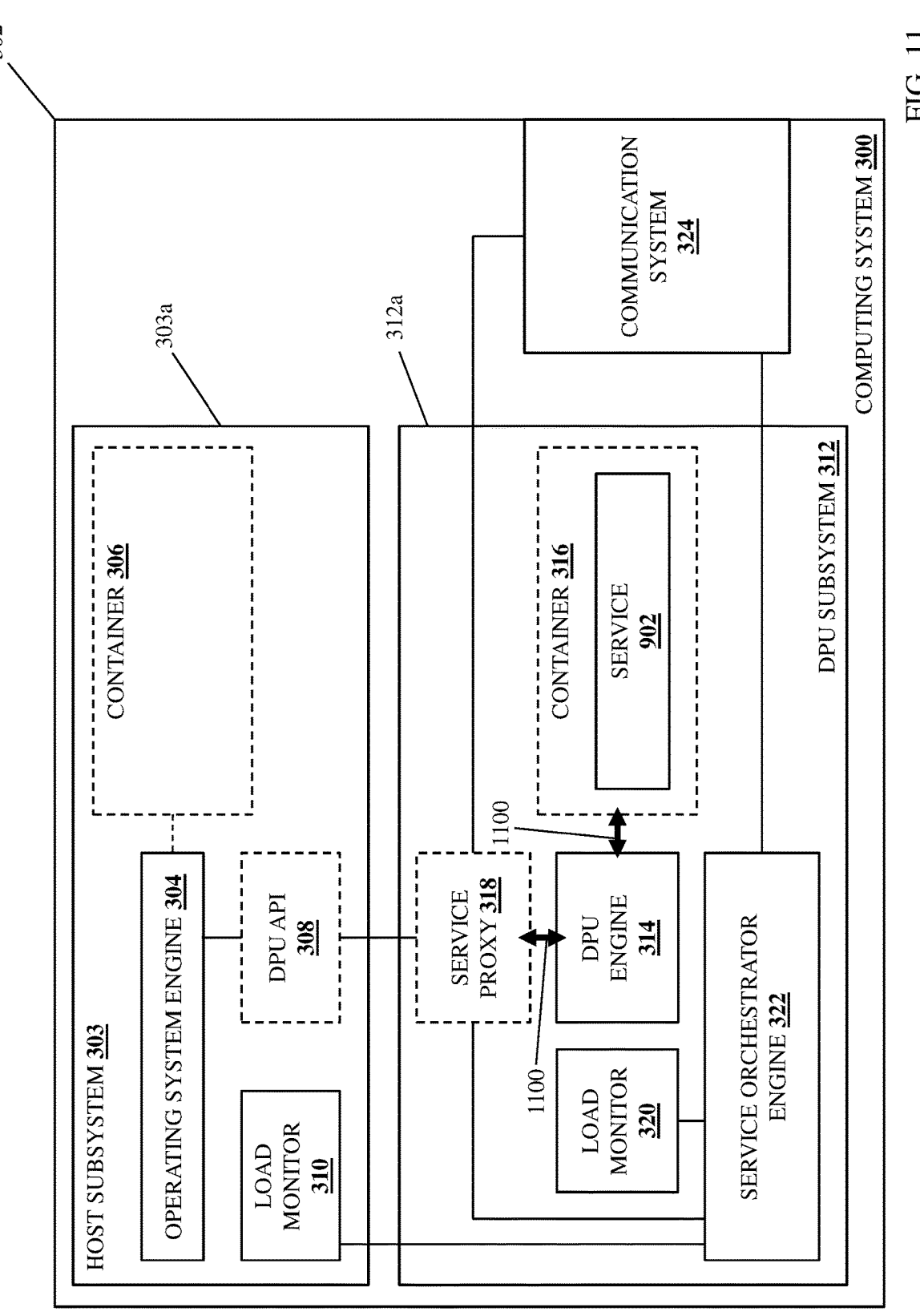
FIG. 11 is a schematic view illustrating an embodiment of the computing system of FIG. 3 operating during the method of FIGS. 5A and 5B.
Figure 12A:
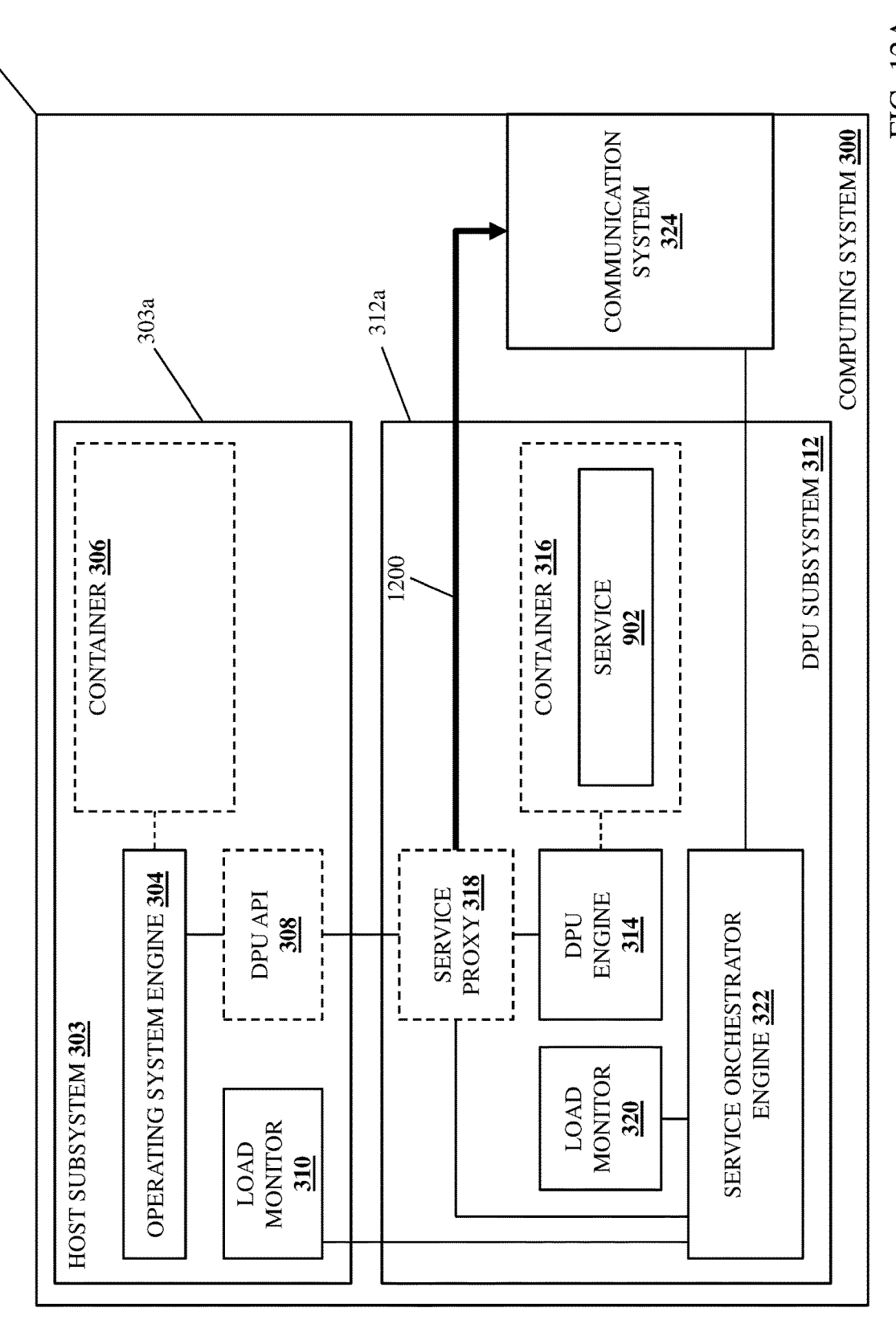
FIG. 12A is a schematic view illustrating an embodiment of the computing system of FIG. 3 operating during the method of FIGS. 5A and 5B.
Figure 12B:
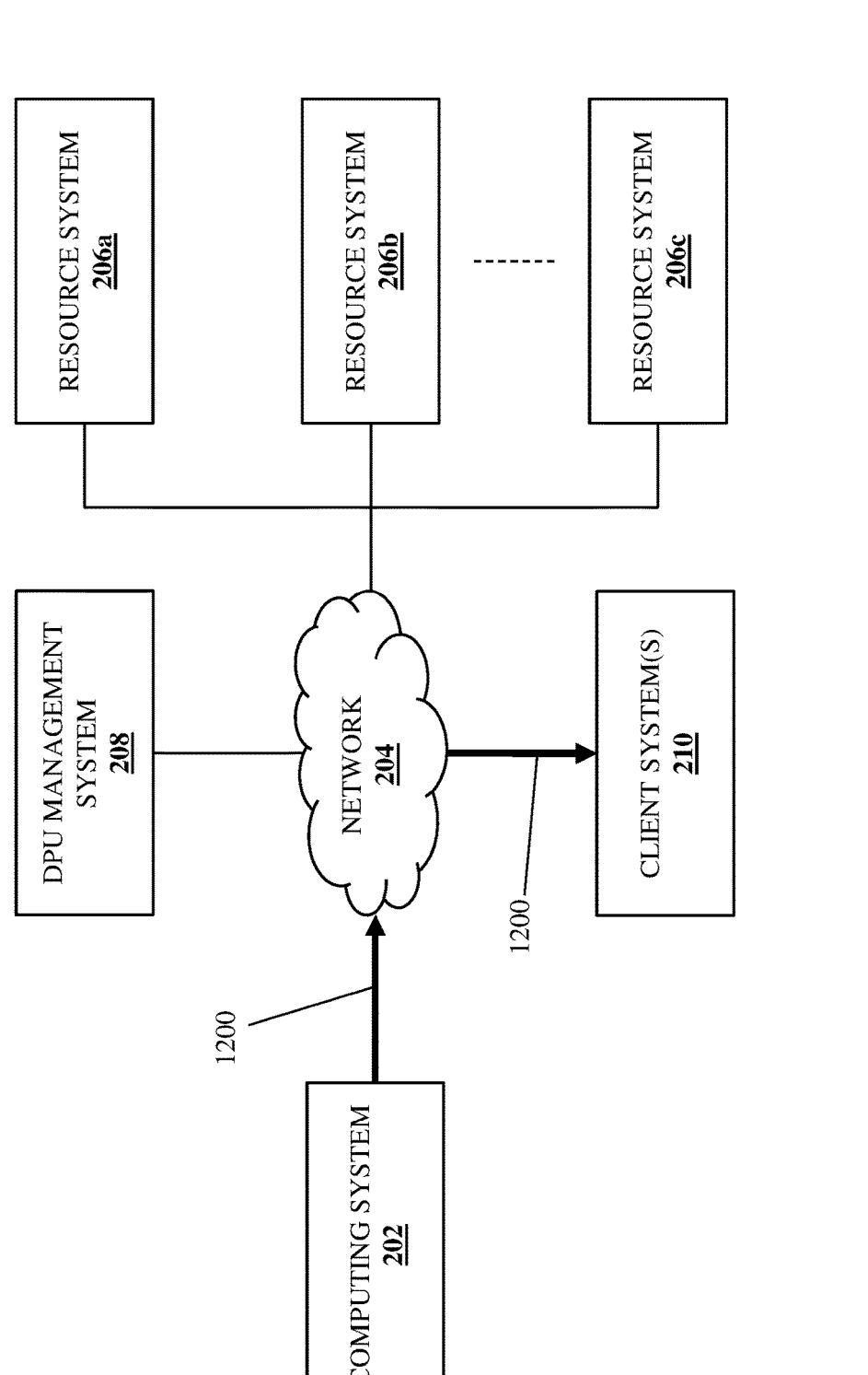
FIG. 12B is a schematic view illustrating an embodiment of the networked system of FIG. 2 operating during the method of FIGS. 5A and 5B.

With reference to FIG. 11, the service proxy 318 and the DPU engine 314 may then perform service request performance operations 1100 that may include the service proxy 318 identifying any of the service operation(s) requested in the service request to the DPU engine 314, the DPU engine 314 performing those service operation(s) using the service 902, the DPU engine 314 providing service operation results, service operation acknowledgements, and/or other performed service operation information known in the art to the service proxy 318, as well as any other service-related functionality that would be apparent to one of skill in the art in possession of the present disclosure. With reference to FIGS. 12A and 12B, the service proxy 318 in the DPU subsystem 312 of the computing system 202/300 may then perform service request result transmission operations 1200 that may include transmitting a service result (e.g., data requested in the service request, a confirmation that the service request was performed, etc.) via the communication system 324 in the computing system 202/300 and via the network 204 to the client system(s) 210 (e.g., the client system(s) 210 that provided the service request, the client subsystem(s) provided by the host subsystem 303 and/or DPU subsystem 312 in the computing device 202/300 that provided the service request, etc.). However, while a specific example has been provided, one of skill in the art in possession of the present disclosure will appreciate how the client system(s) 210 may interact with the service 902 being provided via the DPU subsystem 312 at block 512 in any of a variety of manners that will fall within the scope of the present disclosure.

Figure 13:
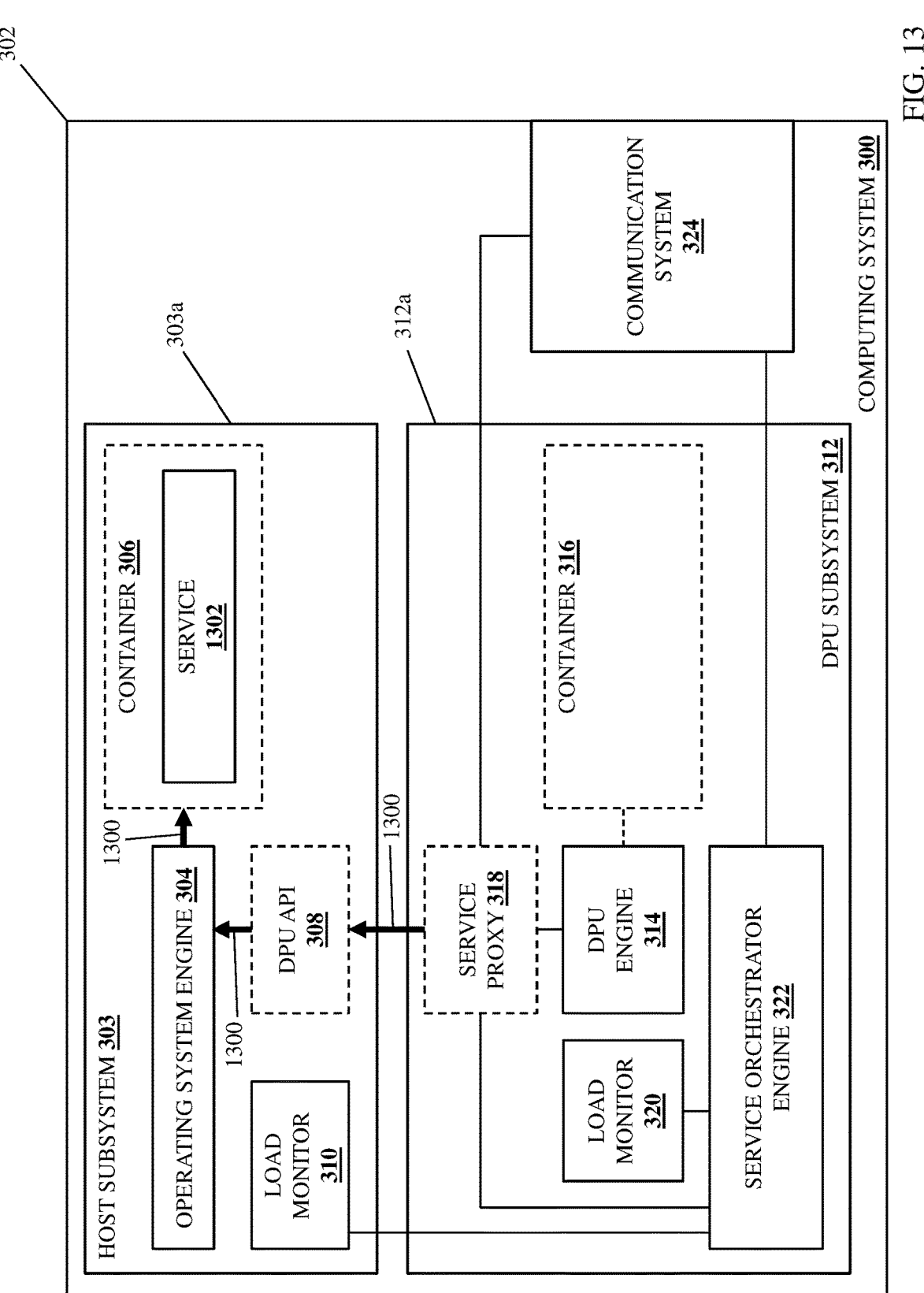
FIG. 13 is a schematic view illustrating an embodiment of the computing system of FIG. 3 operating during the method of FIGS. 5A and 5B.

If, at decision block 508 it was determined to provide the service using the host subsystem, the method 500 proceeds to optional block 514 where the DPU subsystem configures the host subsystem to provide the service. With reference to FIG. 13, in an embodiment of optional block 514, the service proxy 318 may perform host service configuration operations 1300 that may include using the service configuration information to configure the operating system engine 304 via the DPU API 308 to provide a service 1302 via the container 306. While not illustrated in FIG. 13, following the configuration of the host subsystem 303 to provide the service 1302, the service proxy 318 may provide a notification to the DPU management system 208, any client system(s) 210 that may have requested the service 1302, and/or any other entities associated with the service 1302, with that notification identifying that the service 1302 is available, identifying that the service proxy 318 provides the service access point for the service 1302, and/or identifying any other deployed service information that would be apparent to one of skill in the art in possession of the present disclosure. As will be appreciated by one of skill in the art in possession of the present disclosure, optional block 514 may be performed to initially configure the host subsystem 303 to provide the service 1302, after which optional block 514 may be skipped as long as the host subsystem 303 is providing the service 1302.

Figure 14A:
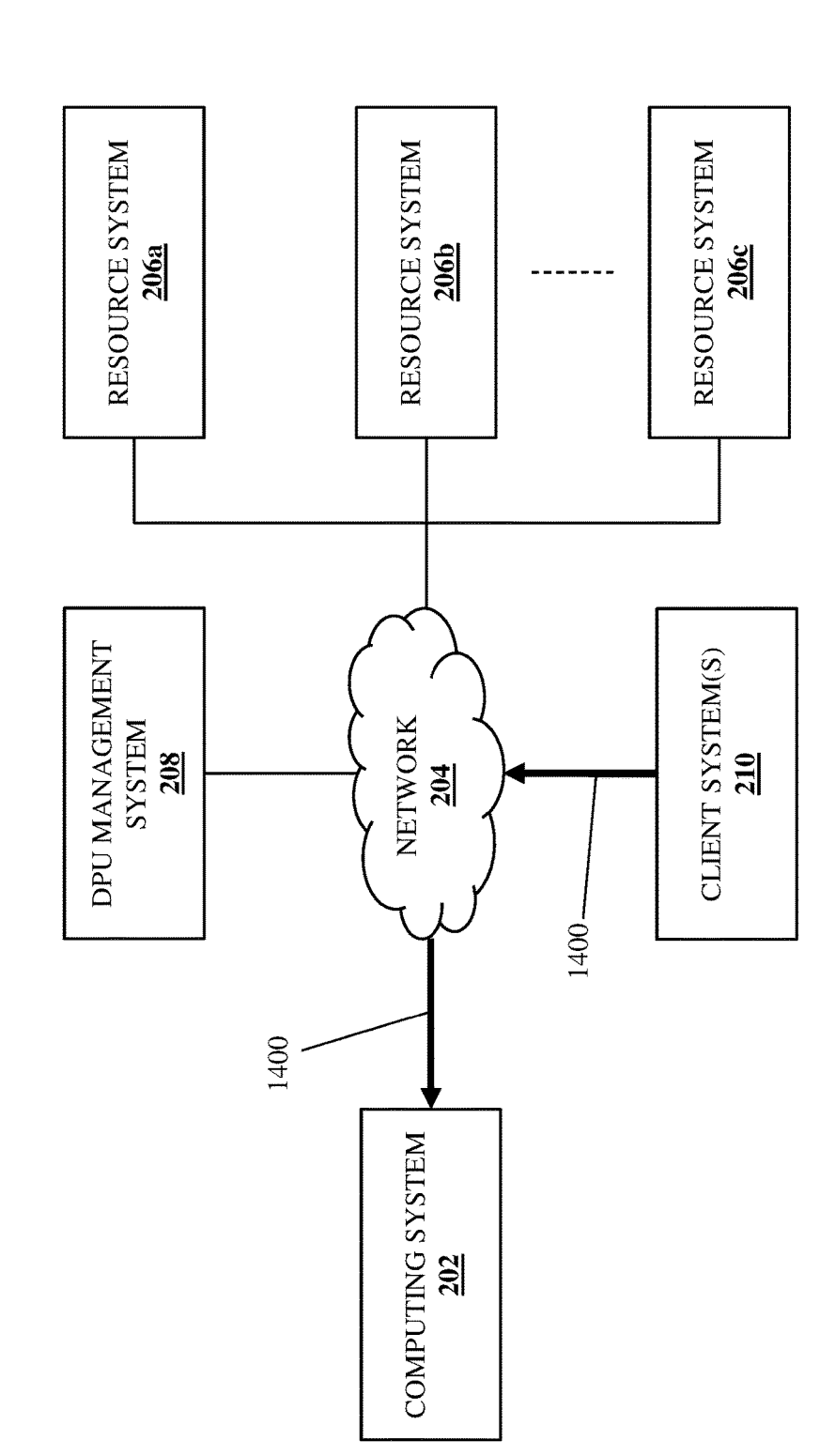
FIG. 14A is a schematic view illustrating an embodiment of the networked system of FIG. 2 operating during the method of FIGS. 5A and 5B.
Figure 14B:
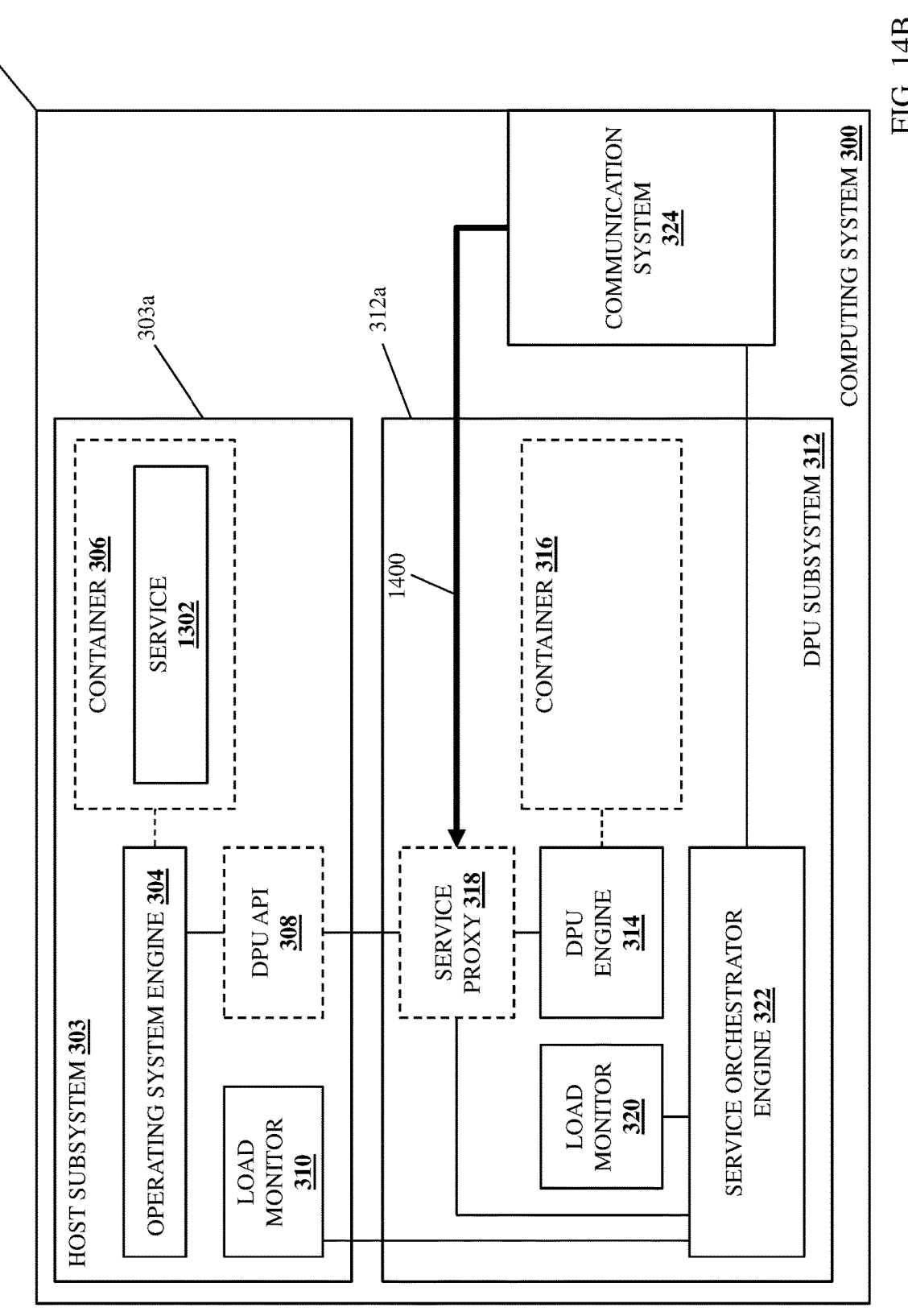
FIG. 14B is a schematic view illustrating an embodiment of the computing system of FIG. 3 operating during the method of FIGS. 5A and 5B.

The method 500 then proceeds to block 516 where the DPU subsystem proxies service requests between one or more client systems and the host subsystem. With reference to FIGS. 14A and 14B, in an embodiment of block 516, the client system(s) 210 (or client subsystem(s) provided by the host subsystem 303 and/or DPU subsystem 312 in the computing device 202/300) may perform service request transmission operations 1400 that include generating and transmitting a service request to the DPU subsystem 312 in the computing system 202/300 via the network 204 such that it is received by the service proxy 318 in the DPU subsystem 312 of the computing system 202/300. As will be appreciated by one of skill in the art in possession of the present disclosure, the service request received at block 516 may identify the service 1302, a request to perform one or more service operation associated with the service, and/or any other service request information that would be apparent to one of skill in the art in possession of the present disclosure.

Figure 15:
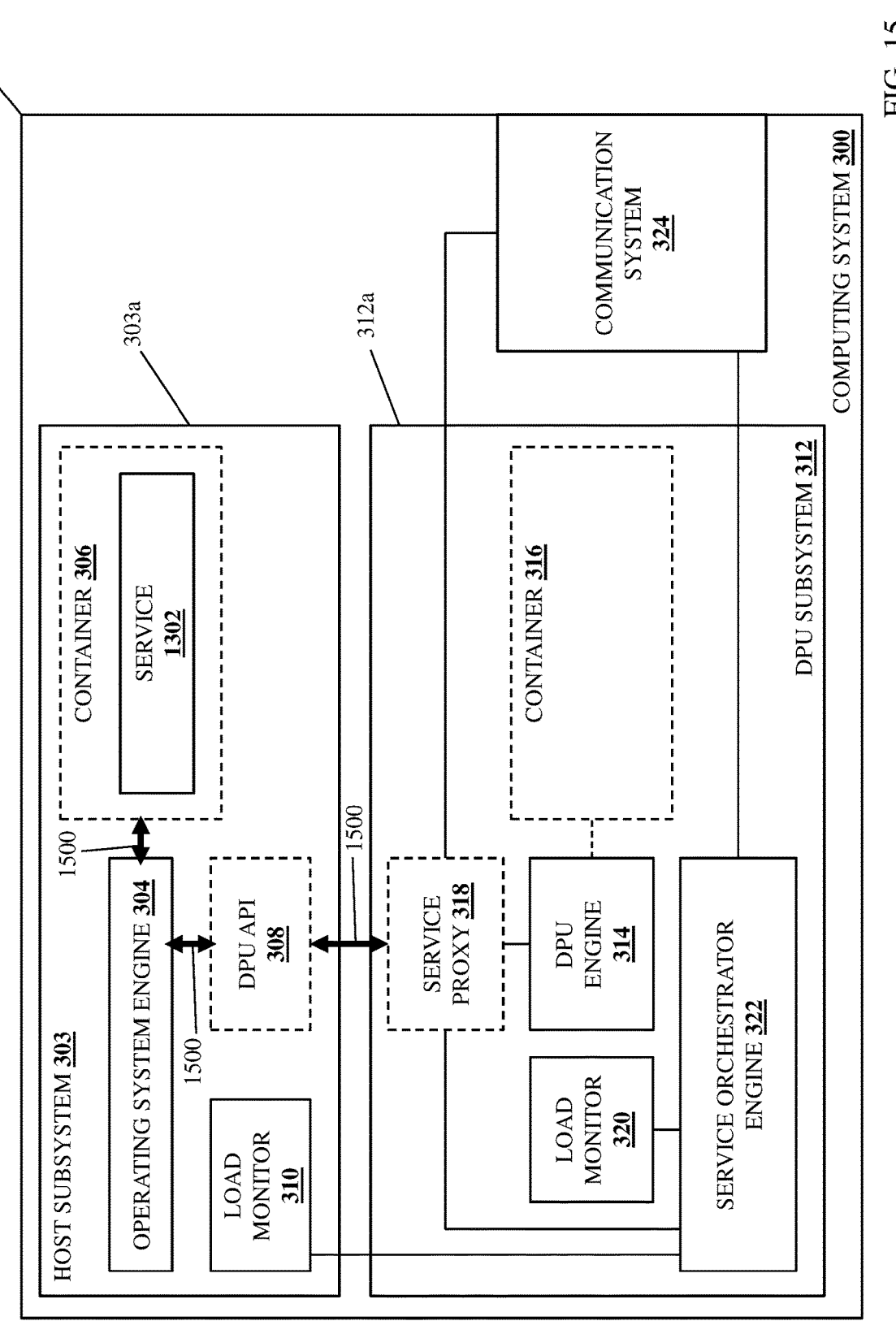
FIG. 15 is a schematic view illustrating an embodiment of the computing system of FIG. 3 operating during the method of FIGS. 5A and 5B.
Figure 16A:
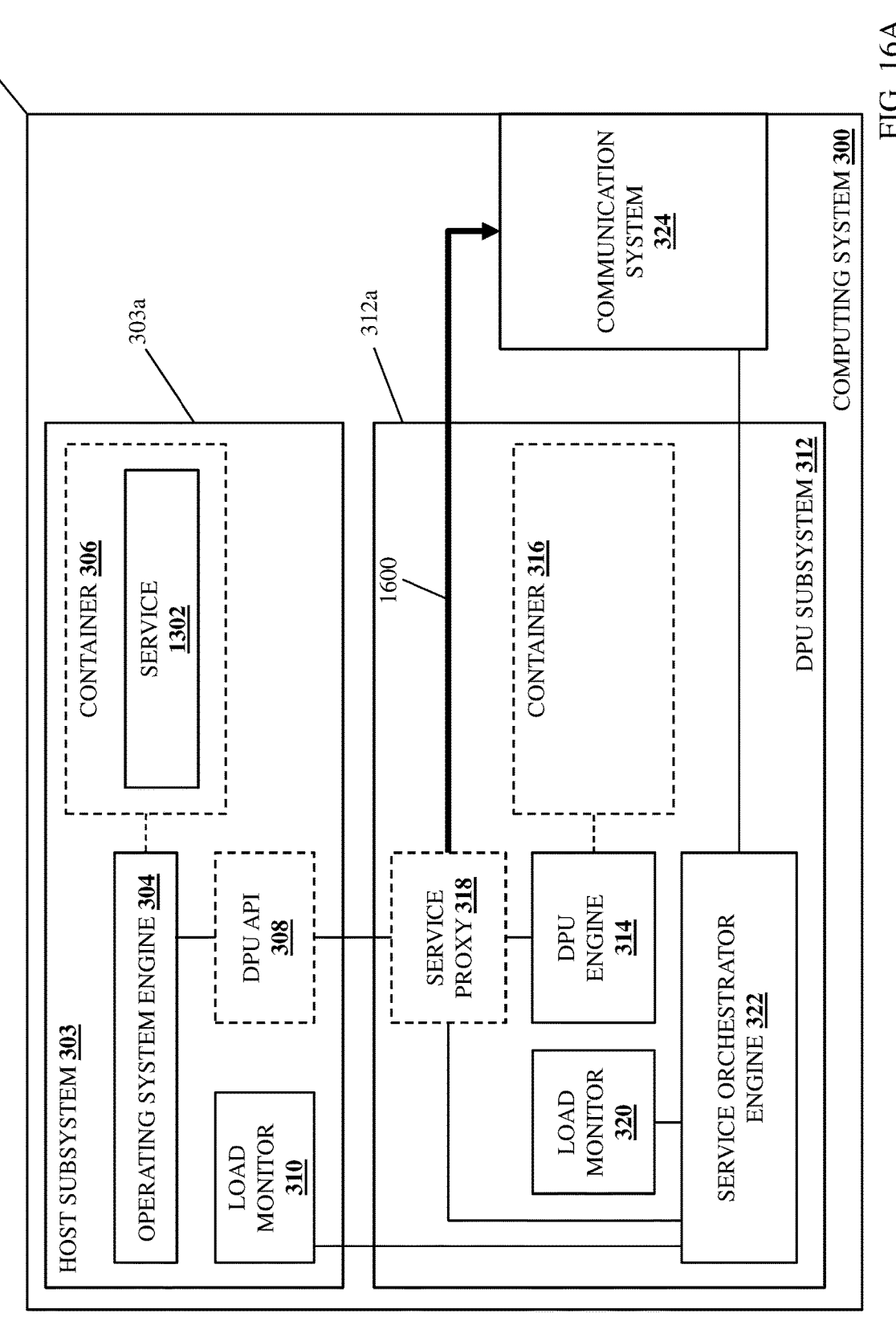
FIG. 16A is a schematic view illustrating an embodiment of the computing system of FIG. 3 operating during the method of FIGS. 5A and 5B.
Figure 16B:
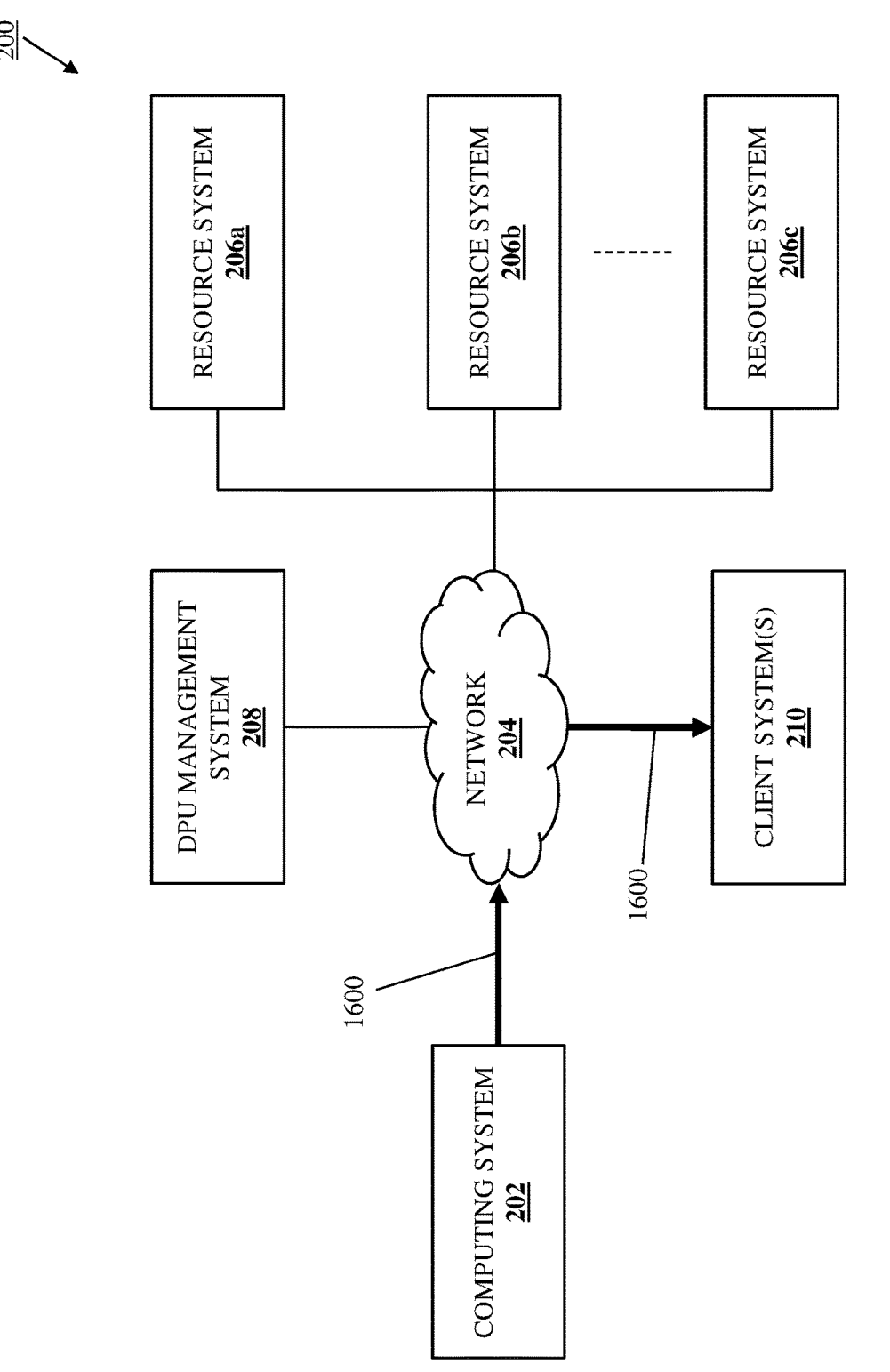
FIG. 16B is a schematic view illustrating an embodiment of the networked system of FIG. 2 operating during the method of FIGS. 5A and 5B.

With reference to FIG. 15, the service proxy 318 and the operating system engine 304 may then perform service request performance operations 1500 that may include the service proxy 318 identifying any of the service operation(s) requested in the service request to the operating system engine 304 via the DPU API 308, the operating system engine 304 performing those service operation(s) using the service 1302, the operating system engine 304 providing service operation results, service operation acknowledgements, and/or other performed service operation information known in the art via the DPU API 308 to the service proxy 318, as well as any other service-related functionality that would be apparent to one of skill in the art in possession of the present disclosure. With reference to FIGS. 16A and 16B, the service proxy 318 in the DPU subsystem 312 of the computing system 202/300 may then perform service request result transmission operations 1600 that may include transmitting a service result (e.g., data requested in the service request, a confirmation that the service request was performed, etc.) via the communication system 324 in the computing system 202/300 and via the network 204 to the client system(s) 210 (e.g., the client system(s) 210 that provided the service request, the client subsystem(s) provided by the host subsystem 303 and/or DPU subsystem 312 in the computing device 202/300 that provided the service request, etc.). As such, the service proxy 318 may proxy service requests between the client system(s) 210 and the service 1302 provided by the host subsystem 303, while abstracting the location of the service 1302 provided by the host subsystem 303. However, while a specific example has been provided, one of skill in the art in possession of the present disclosure will appreciate how the client system(s) 210 may interact with the service 1302 being provided via the host subsystem 303 at block 516 in any of a variety of manners that will fall within the scope of the present disclosure.

Figure 17A:
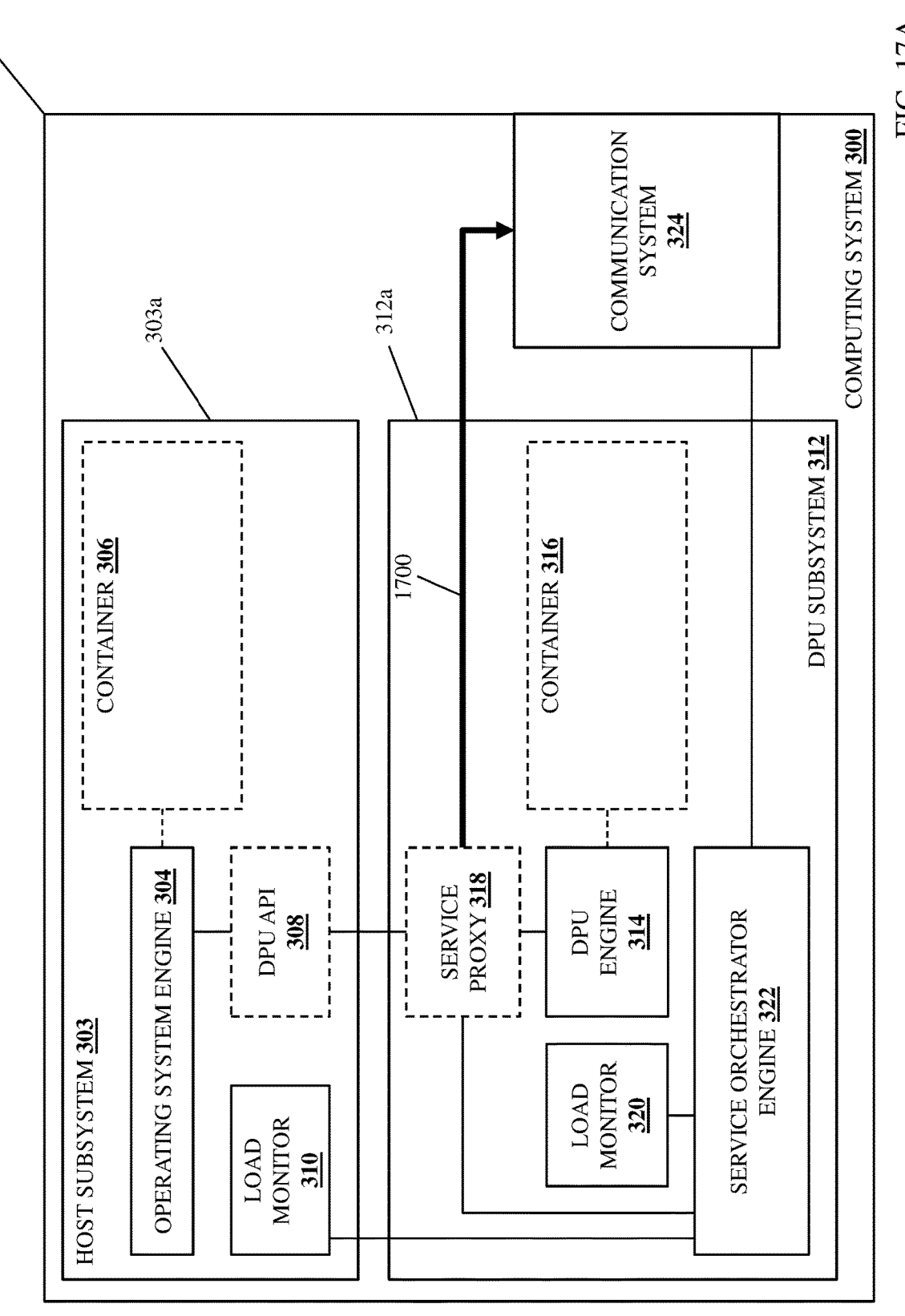
FIG. 17A is a schematic view illustrating an embodiment of the computing system of FIG. 3 operating during the method of FIGS. 5A and 5B.
Figure 17B:
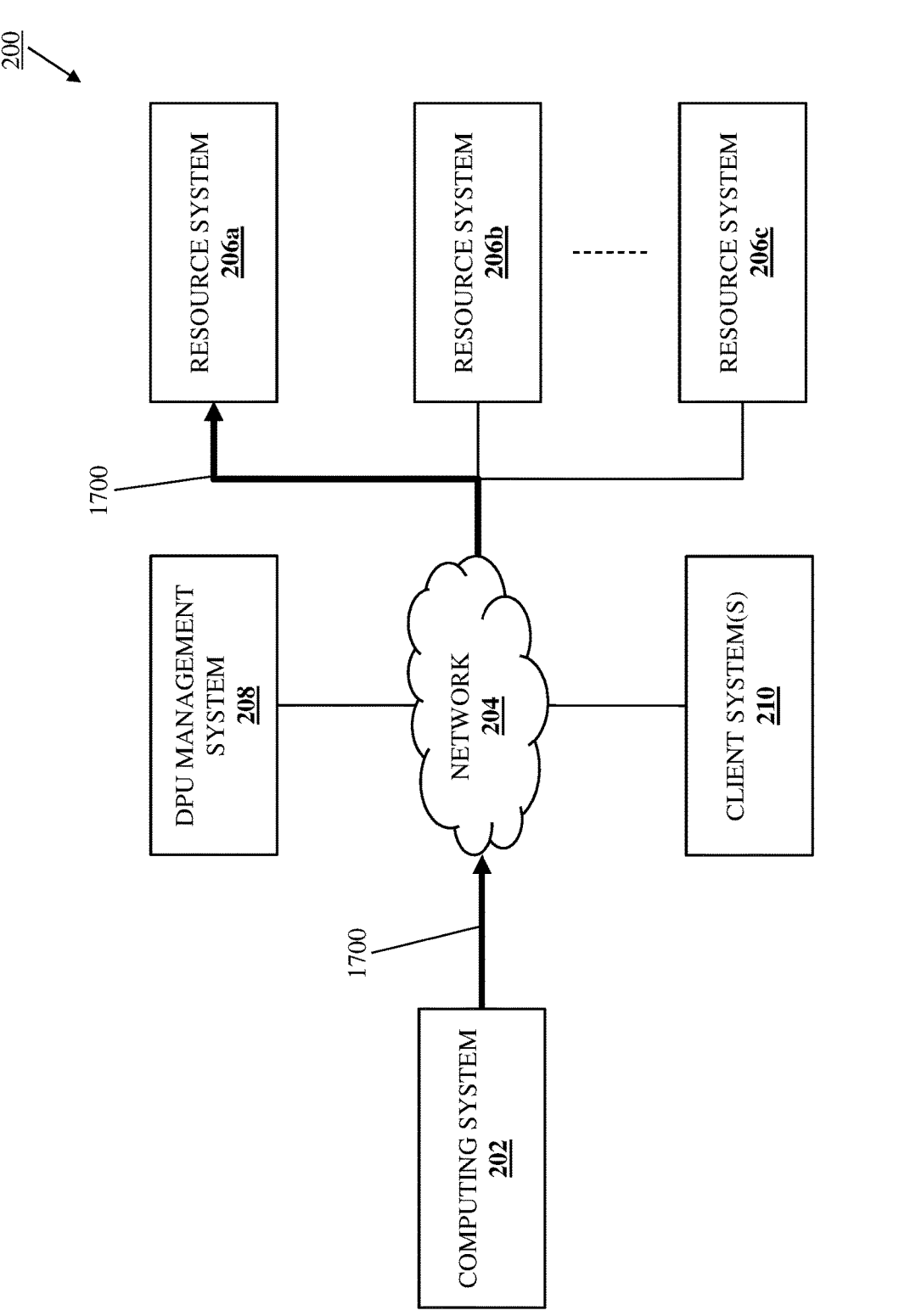
FIG. 17B is a schematic view illustrating an embodiment of the networked system of FIG. 2 operating during the method of FIGS. 5A and 5B.
Figure 17C:
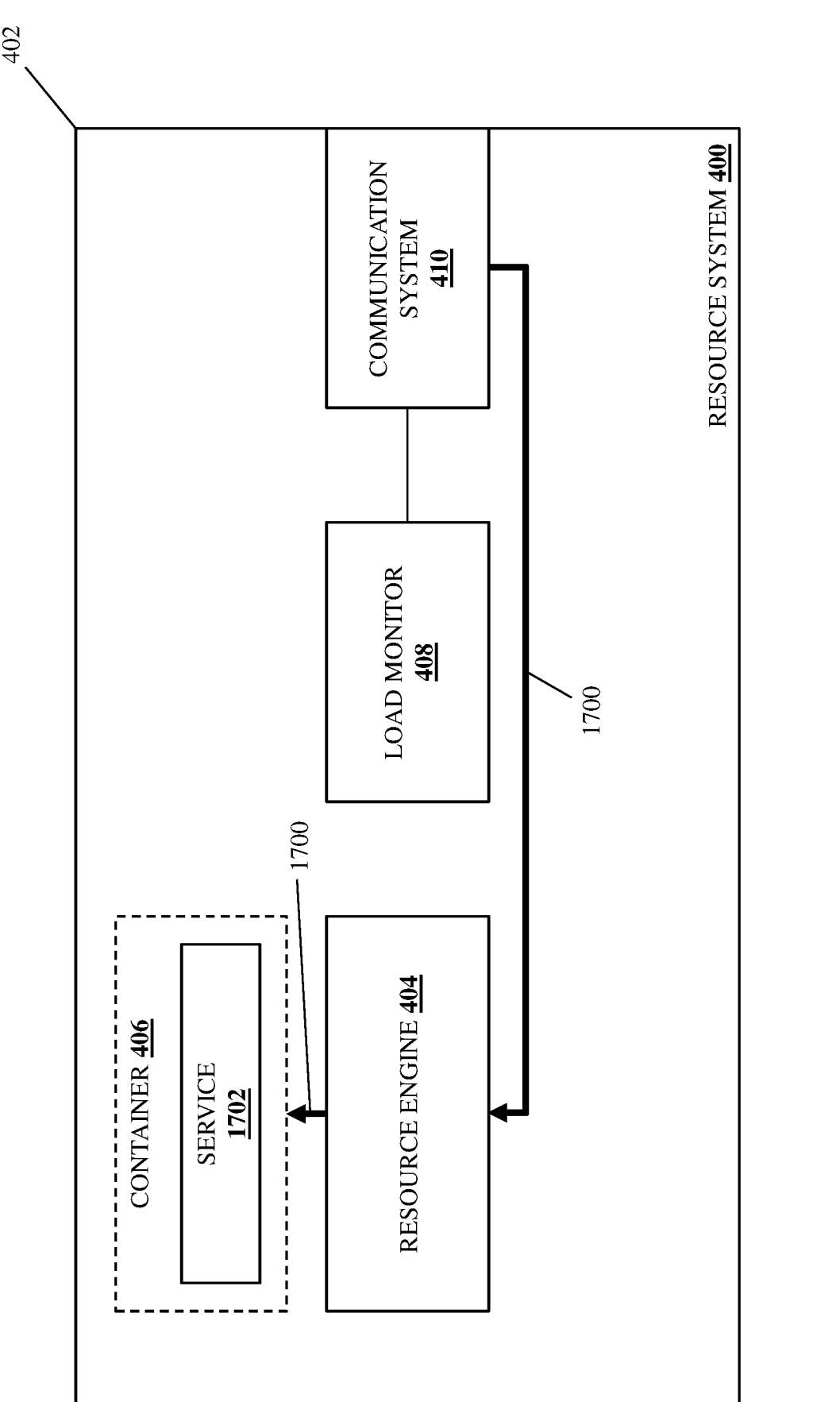
FIG. 17C is a schematic view illustrating an embodiment of the resource system of FIG. 4 operating during the method of FIGS. 5A and 5B.

If, at decision block 508, it was determined to provide the service using a resource system, the method 500 proceeds to optional block 518 where the DPU subsystem configures the resource system to provide the service. With reference to FIGS. 17A, 17B, and 17C, in an embodiment of optional block 518, the service proxy 318 may perform resource service configuration operations 1700 via the communication system 324 in the computing device 202/300, the network 204, and the communication system 410 in the resource system 410, that may include using the service configuration information to configure the resource engine 304 in the resource system 206a/400 to provide a service 1702 via the container 406. While not illustrated in FIGS. 17A, 17B, and 17C, following the configuration of the resource system 206a/400 to provide the service 1702, the service proxy 318 may provide a notification to the DPU management system 208, any client system(s) 210 that may have requested the service 1702, and/or any other entities associated with the service 1702, with that notification identifying that the service 1702 is available, identifying that the service proxy 318 provides the service access point for the service 1702, and/or identifying any other deployed service information that would be apparent to one of skill in the art in possession of the present disclosure. As will be appreciated by one of skill in the art in possession of the present disclosure, optional block 518 may be performed to initially configure the resource system 206a/400 to provide the service 1702, after which optional block 518 may be skipped as long as the resource system 206a/400 is providing the service 1702.

Figure 18A:
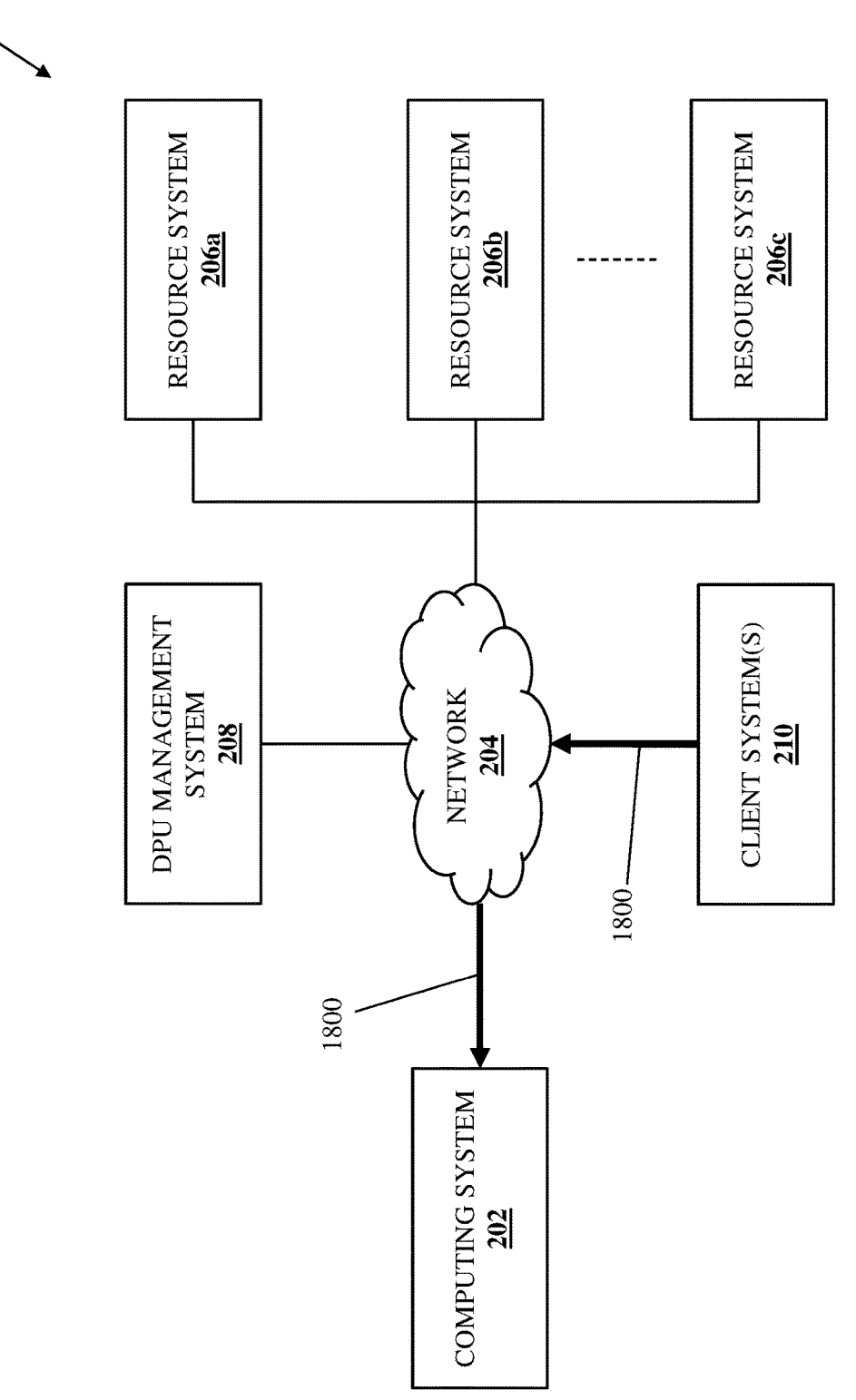
FIG. 18A is a schematic view illustrating an embodiment of the networked system of FIG. 2 operating during the method of FIGS. 5A and 5B.
Figure 18B:
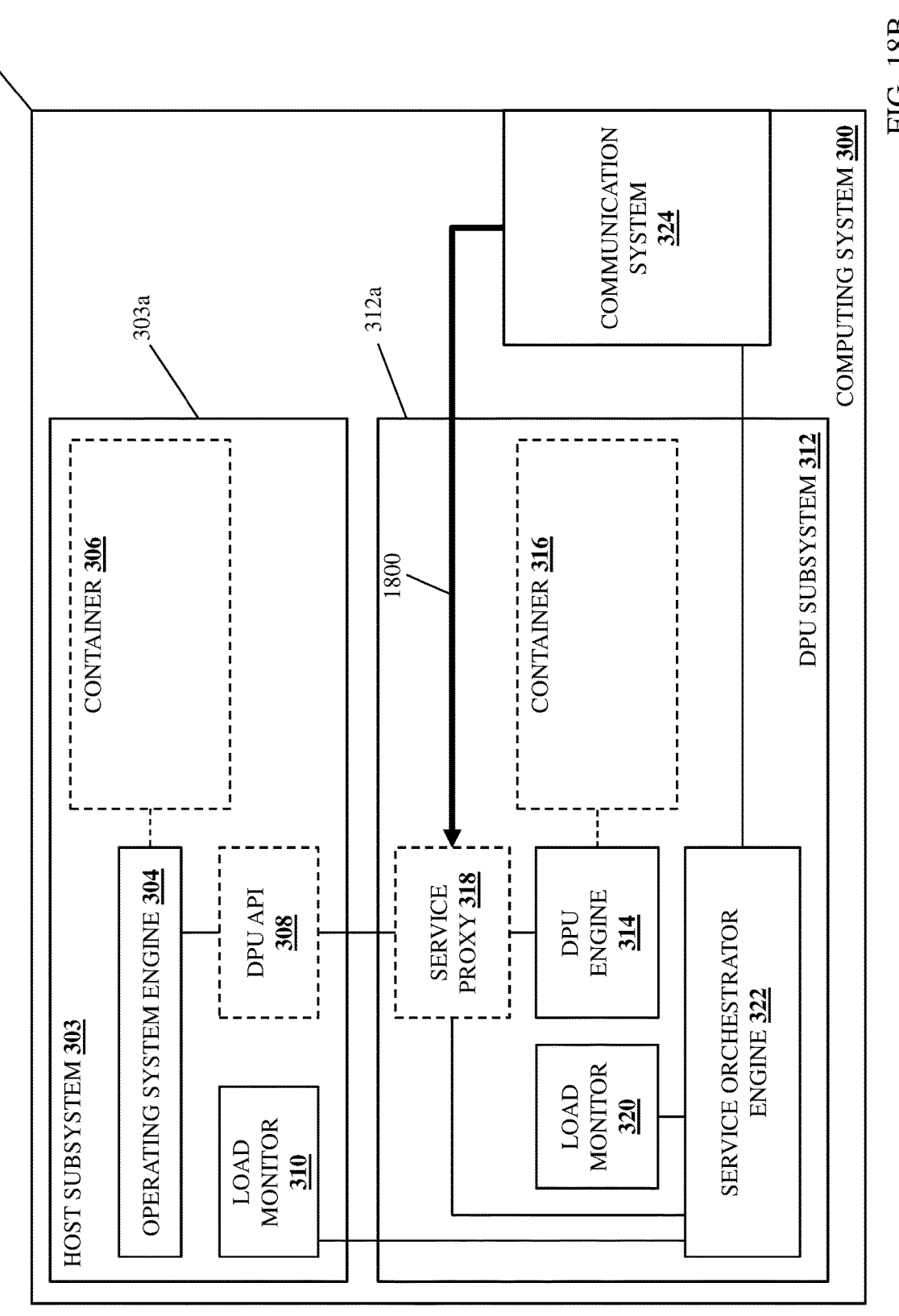
FIG. 18B is a schematic view illustrating an embodiment of the computing system of FIG. 3 operating during the method of FIGS. 5A and 5B.

The method 500 then proceeds to block 520 where the DPU subsystem proxies service requests between one or more client systems and the resource system. With reference to FIGS. 18A and 18B, in an embodiment of block 520, the client system(s) 210 (or client subsystem(s) provided by the host subsystem 303 and/or DPU subsystem 312 in the computing device 202/300) may perform service request transmission operations 1800 that include generating and transmitting a service request to the DPU subsystem 312 in the computing system 202/300 via the network 204 such that it is received by the service proxy 318 in the DPU subsystem 312 of the computing system 202/300. As will be appreciated by one of skill in the art in possession of the present disclosure, the service request received at block 520 may identify the service 1702, a request to perform one or more service operation associated with the service, and/or any other service request information that would be apparent to one of skill in the art in possession of the present disclosure.

Figure 19A:
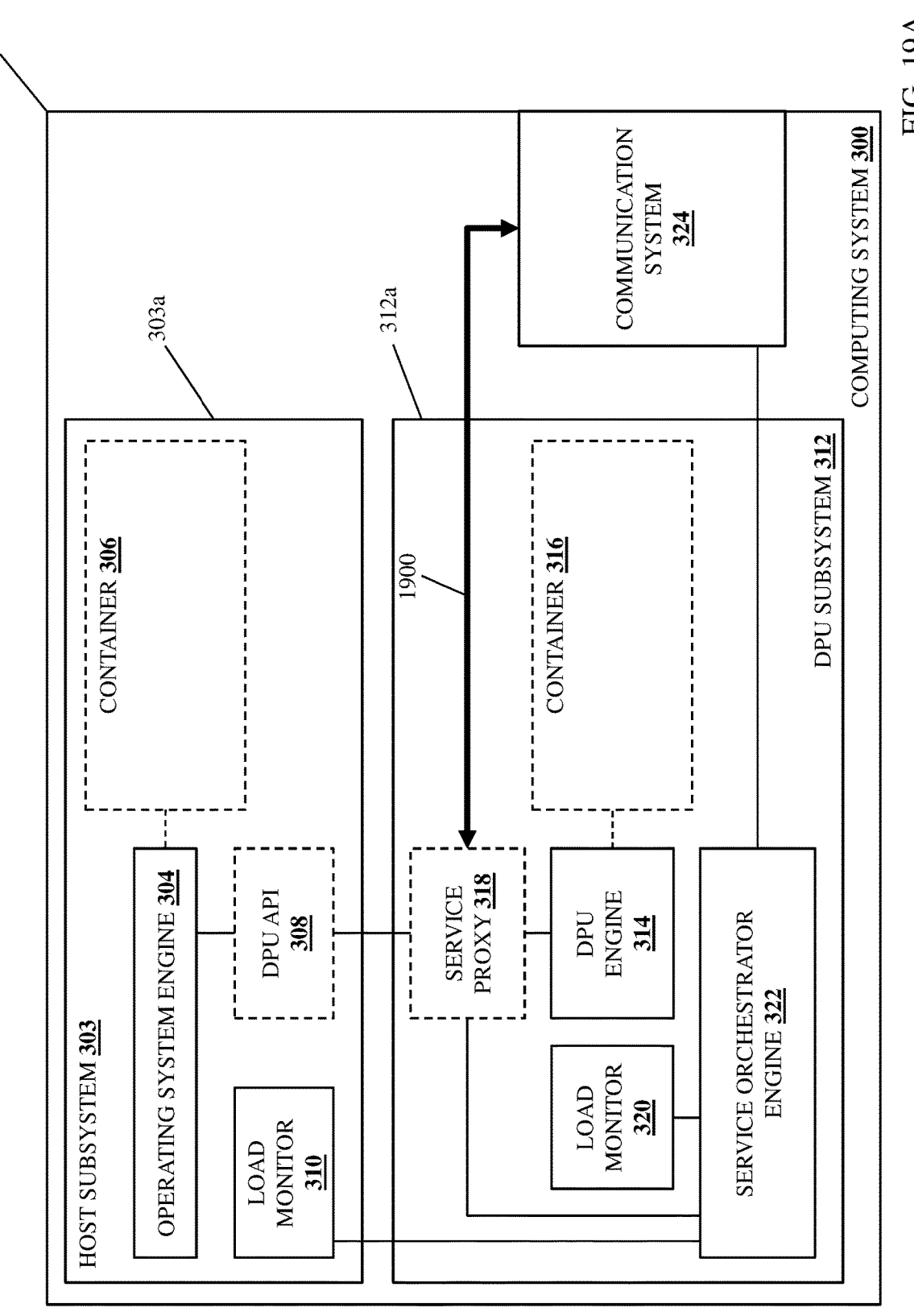
FIG. 19A is a schematic view illustrating an embodiment of the computing system of FIG. 3 operating during the method of FIGS. 5A and 5B.
Figure 19B:
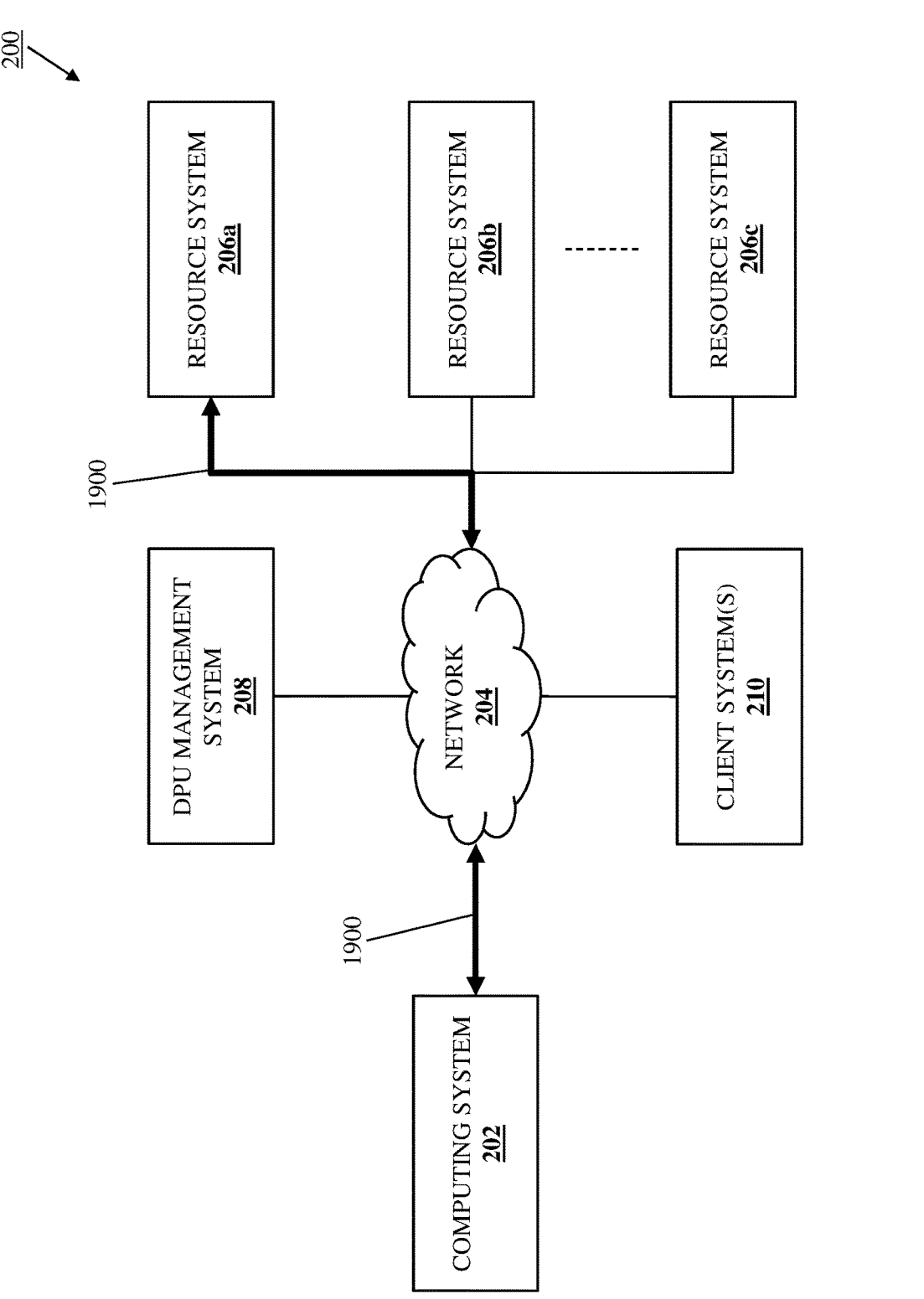
FIG. 19B is a schematic view illustrating an embodiment of the networked system of FIG. 2 operating during the method of FIGS. 5A and 5B.
Figure 19C:
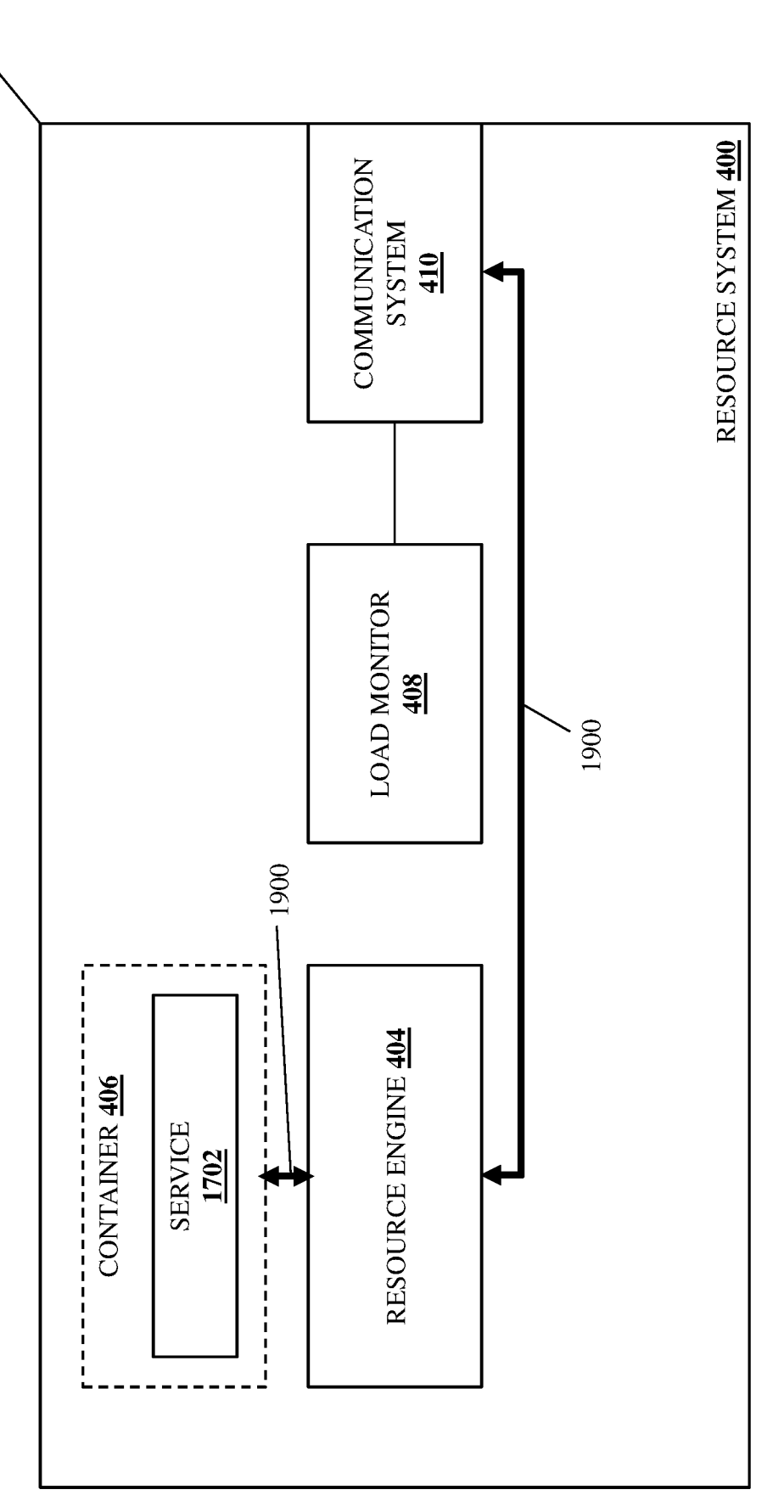
FIG. 19C is a schematic view illustrating an embodiment of the resource system of FIG. 4 operating during the method of FIGS. 5A and 5B.

With reference to FIGS. 19A, 19B, and 19C, the service proxy 318 and the resource engine 404 may then perform service request performance operations 1900 via the communication system 324 in the computing device 202/300, the network 204, and the communication system 410 in the resource system 400, that may include the service proxy 318 identifying any of the service operation(s) requested in the service request to the resource engine 404 in the resource system 206a/400, the resource engine 404 performing those service operation(s) using the service 1702, the resource engine 404 providing service operation results, service operation acknowledgements, and/or other performed service operation information known in the art to the service proxy 318, as well as any other service-related functionality that would be apparent to one of skill in the art in possession of the present disclosure.

Figure 20A:
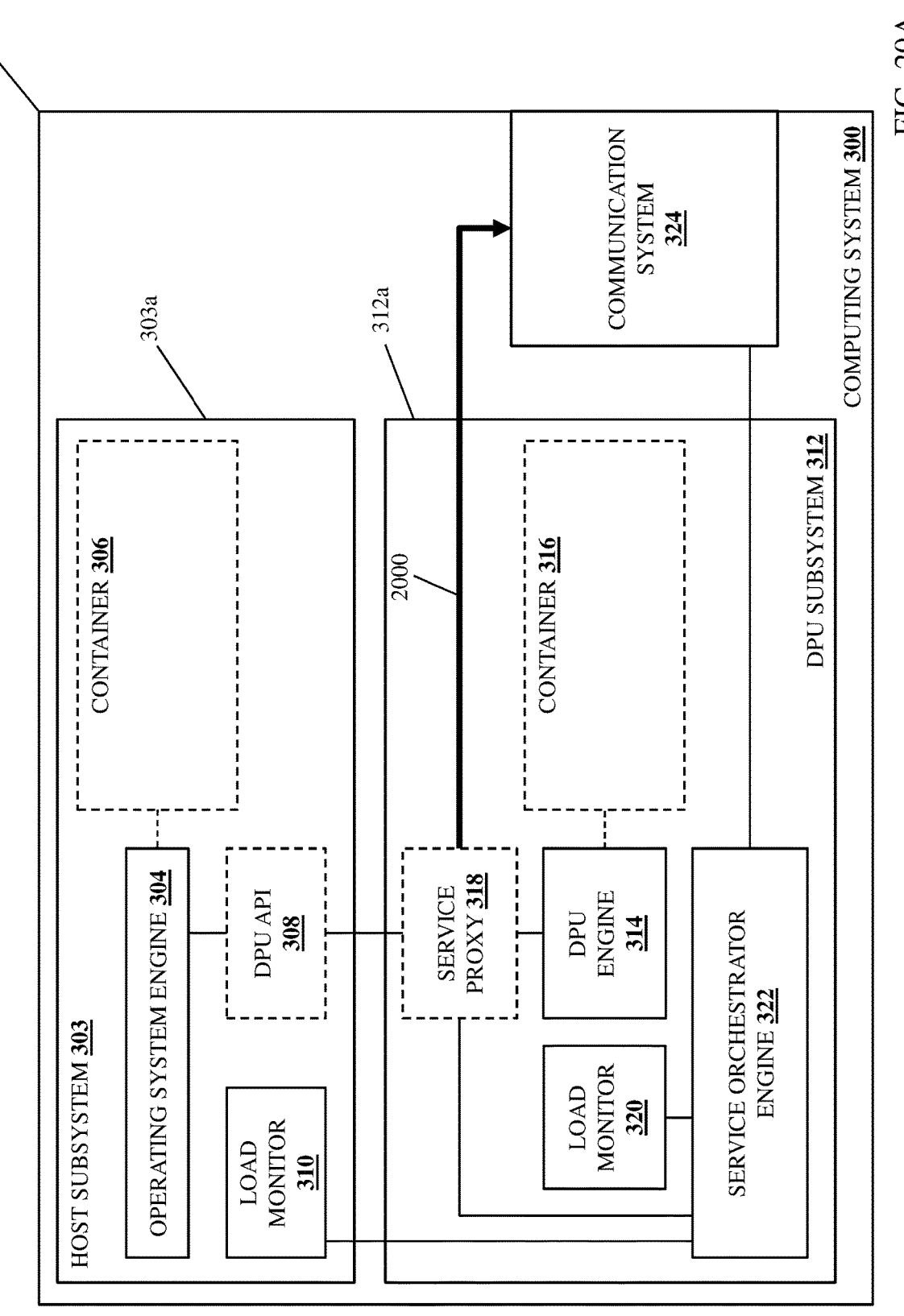
FIG. 20A is a schematic view illustrating an embodiment of the computing system of FIG. 3 operating during the method of FIGS. 5A and 5B.
Figure 20B:
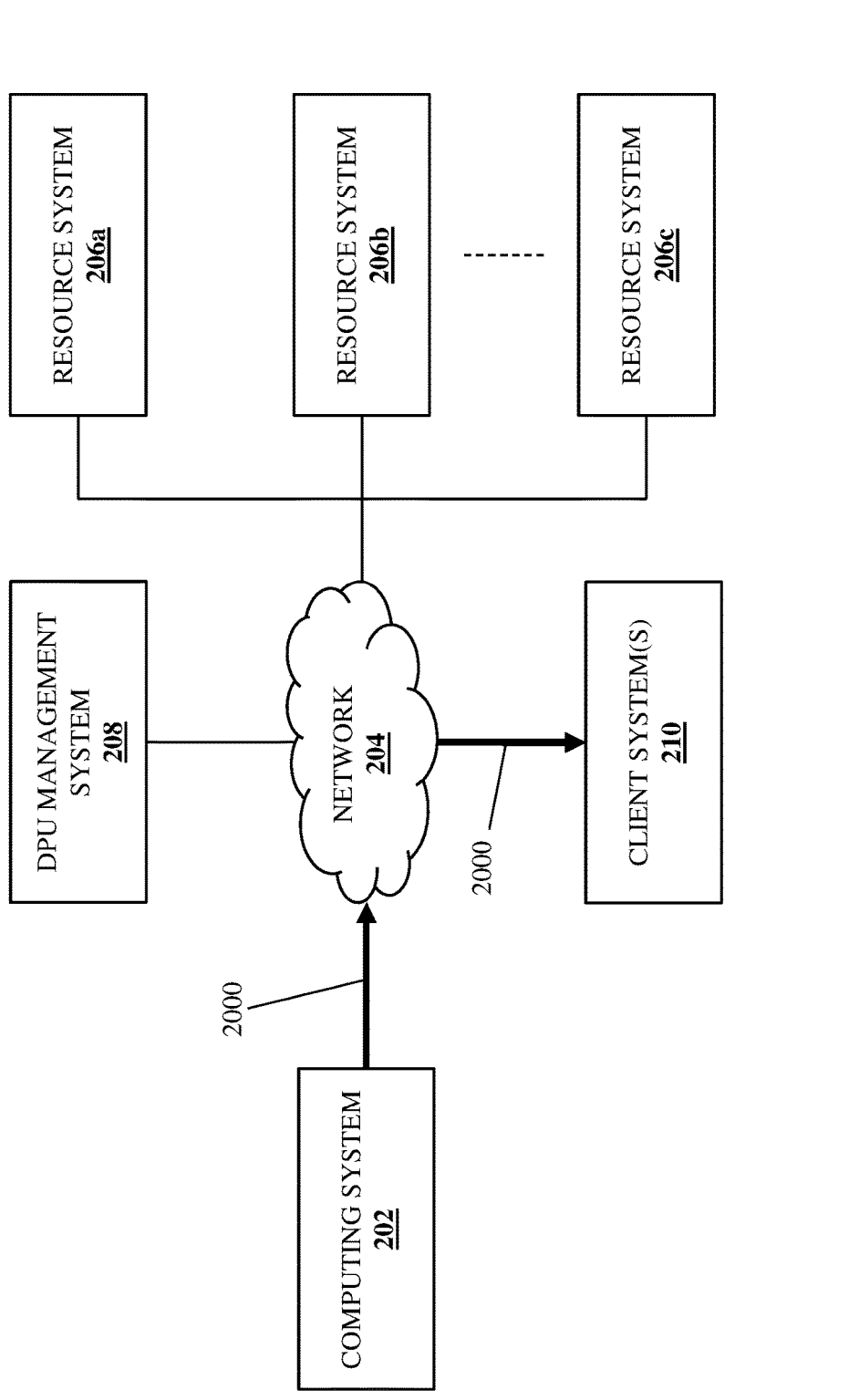
FIG. 20B is a schematic view illustrating an embodiment of the networked system of FIG. 2 operating during the method of FIGS. 5A and 5B.

With reference to FIGS. 20A and 20B, the service proxy 318 in the DPU subsystem 312 of the computing system 202/300 may then perform service request result transmission operations 2000 that may include transmitting a service result (e.g., data requested in the service request, a confirmation that the service request was performed, etc.) via the communication system 324 in the computing system 202/300 and via the network 204 to the client system(s) 210 (e.g., the client system(s) 210 that provided the service request, the client subsystem(s) provided by the host subsystem 303 and/or DPU subsystem 312 in the computing device 202/300 that provided the service request, etc.). As such, the service proxy 318 may proxy service requests between the client system(s) 210 and the service 1702 provided by the resource system 260a/400, while abstracting the location of the service 1702 provided by the resource system 206a/400. However, while a specific example has been provided, one of skill in the art in possession of the present disclosure will appreciate how the client system(s) 210 may interact with the service 1702 being provided via the resource system 206a/400 at block 520 in any of a variety of manners that will fall within the scope of the present disclosure.

Following blocks 512, 516, or 520, the method 500 then returns to block 506. As such, one of skill in the art in possession of the present disclosure will appreciate how some embodiments of the method 500 may loop such that the one of the host subsystem 303, the DPU subsystem 312, and the resource system 206a/400 that provides the service after a first iteration of the method 500 continues to provide that service on subsequent iterations of the method 500. For example, as long as the operating loads of the host subsystem 303, the DPU subsystem 312, and the resource system 206a/400 remain the same (or relatively similar), the one of the host subsystem 303, the DPU subsystem 312, and the resource system 206a/400 that provides the service after a first iteration of the method 500 may continue to provide that service on subsequent iterations of the method 500.

However, one of skill in the art in possession of the present disclosure will also appreciate how some embodiments of the method 500 may loop such that the one of the host subsystem 303, the DPU subsystem 312, and the resource system 206a/400 that did not provide the service after a previous iteration of the method 500 is configured to provide that service on a subsequent iteration of the method 500 (with the one of the host subsystem 303, the DPU subsystem 312, and the resource system 206a/400 that provided the service after the previous iteration of the method 500 then configured to stop providing the service). For example, in the event the operating loads of the host subsystem 303, the DPU subsystem 312, and the resource system 206a/400 change in a manner that results in higher performance, more efficient, or otherwise more optimal performance of the service using another of the host subsystem 303, the DPU subsystem 312, and the resource system 206a/400, the service may be "migrated" between any of the host subsystem 303, the DPU subsystem 312, and the resource system 206a/400, and such migrations may be performed periodically when operating loads call for it in order to ensure the highest performance, most efficient, or otherwise most optimal performance of the service. In such embodiments, the service proxy 318 may receive service requests from the client systems(s) 210 even when the service is provided by the DPU subsystem 312 in order to, for example, make such service migrations non-disruptive to existing client system(s) 210.

Thus, systems and methods have been described that provide a service for client system(s) via a host subsystem and/or a DPU subsystem using a DPU subsystem that is configured to identify where the service should be provided based on operating loads of the host subsystem and the DPU subsystem, and either perform service requests from the client system(s), or proxy service requests between the client system(s) and the host subsystem. As will be appreciated by one of skill in the art in possession of the present disclosure, the host/DPU service provisioning system of the present disclosure overcomes limitations in conventional host/DPU service provisioning systems to provide performance that is competitive with host-only service provisioning systems, provides the ability to perform complex services and microservices using host subsystems, DPU subsystems, and available resource systems accessible via an interconnect or other fabric, enhances the ability to optimally allocate the functionality of host subsystems, DPU subsystems, and resource systems based on changing operating loads, and facilitates the addition of new types of interconnect/fabric resources (e.g., accelerators, memory, storage, etc.).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing system, comprising:
   a chassis;
   a host subsystem that is housed in the chassis and that includes a host subsystem load monitor that is configured to monitor one or more physical host components in the host subsystem and, in response, generate and transmit host operating load information that identifies utilization of the one or more physical host component; and
   a Data Processing Unit (DPU) subsystem that is housed in the chassis, that is coupled to the host subsystem, and that is configured to:
      receive a service provisioning instruction to provide a hardware-enabled service for at least one client system;
      monitor, using a DPU subsystem load monitor, one or more physical DPU components in the DPU subsystem and determine DPU operating load information that identifies utilization of the one or more physical DPU components;
      determine, using the host operating load information transmitted by the host subsystem load monitor, a host operating load that identifies the utilization of the one or more physical host components in the host subsystem;

determine, using the DPU operating load information determined by the DPU subsystem load monitor, a DPU operating load that identifies the utilization of the one or more physical DPU components in the DPU subsystem;
provide, based on the host operating load and the DPU operating load indicating that the host subsystem should provide the hardware-enabled service, host software code to the host subsystem to configure the host subsystem to provide the hardware-enabled service;
notify the at least one client system that the hardware-enabled service is available and that a service proxy provided by the DPU subsystem provides a service access point for the hardware-enabled service; and
proxy, using the service proxy that abstracts the provisioning of the hardware-enabled service by the host subsystem to the at least one client system, service requests for the hardware-enabled service between the at least one client system and the host subsystem providing the service, wherein the host subsystem is configured to:
   provide the service to the at least one client system in response to the service requests proxied by the DPU subsystem.

2. The system of claim 1, wherein the DPU subsystem is configured to:
   provide, based on the host operating load and the DPU operating load indicating that the DPU subsystem should provide the hardware-enabled service during a first time period, DPU software code to the DPU subsystem to configure the DPU subsystem to provide the hardware-enabled service;
   perform, while providing the hardware-enabled service, service requests for the hardware-enabled service from the at least one client system; and
   provide, based on the host operating load and the DPU operating load indicating that the host subsystem should provide the hardware-enabled service during a second time period that is subsequent to the first time period, the host software code to the host subsystem to configure the host subsystem to provide the hardware-enabled service in order to migrate the hardware-enabled service from being provided by the DPU subsystem to being provided by the host subsystem.

3. The system of claim 2, wherein the providing the DPU software code to the DPU subsystem to configure the DPU subsystem to provide the hardware-enabled service based on the host operating load and the DPU operating load indicating that the DPU subsystem should provide the hardware-enabled service includes:
   determining that the host operating load exceeds a host service provisioning threshold and, in response, providing the DPU software code to the DPU subsystem to configure the DPU subsystem to provide the hardware-enabled service, and
   wherein the configuring the host subsystem to provide the service based on the host operating load and the DPU operating load indicating that the host subsystem should provide the hardware-enabled service includes:
   determining that the host operating load is below a host service provisioning threshold and, in response, providing the host software code to the host subsystem to configure the host subsystem to provide the hardware-enabled service.

4. The system of claim 1, further comprising:
at least one resource system that is coupled to the DPU subsystem via a network and that includes a resource system load monitor that is configured to monitor one or more physical resource components in the resource system and, in response, generate and transmit resource operating load information that identifies utilization of the one or more physical resource components, wherein the DPU subsystem is configured to:
   determine, using the resource operating load information transmitted by the resource system load monitor, a resource operating load that identifies the utilization of the one or more physical resource components in the at least one resource system; and
   provide, based on the resource operating load, the host operating load, and the DPU operating load indicating that the host subsystem should provide the hardware-enabled service, the host software code to the host subsystem to configure the host subsystem to provide the hardware-enabled service.

5. The system of claim 4, wherein the DPU subsystem is configured to:
   provide, based on the resource operating load, the host operating load, and the DPU operating load indicating that the at least one resource system should provide the hardware-enabled service during a first time period, resource software code to the at least one resource system to configure the at least one resource system to provide the hardware-enabled service;
   proxy, using the service proxy that abstracts the provisioning of the hardware-enabled service by the at least one resource system to the at least one client system, service requests for the hardware-enabled service between the at least one client system and the at least one resource subsystem providing the hardware-enabled service; and
   provide, based on the resource operating load, the host operating load, and the DPU operating load indicating that the host subsystem should provide the hardware-enabled service during a second time period that is subsequent to the first time period, the host software to the host subsystem to configure the host subsystem to provide the hardware-enabled service in order to migrate the hardware-enabled service from being provided by the at least one resource system to being provided by the host subsystem.

6. The system of claim 5, wherein the providing the resource software to the at least one resource system to configure the at least one resource system to provide the hardware-enabled service based on the resource operating load, the host operating load, and the DPU operating load indicating that the at least one resource system should provide the hardware-enabled service includes:
   determining that the host operating load exceeds a host service provisioning threshold and the resource operating load is below a resource service provisioning threshold and, in response, providing the resource software code to the at least one resource system to configure the at least one resource system to provide the hardware-enabled service, and
   wherein the providing the host software code to the host subsystem to configure the host subsystem to provide the hardware-enabled service based on the resource operating load, the host operating load, and the DPU operating load indicating that the host subsystem should provide the hardware-enabled service includes:

determining that the host operating load is below a host service provisioning threshold and, in response, providing the host software code to the host subsystem to configure the host subsystem to provide the hardware-enabled service.

7. An Information Handling System (IHS), comprising:
a Data Processing Unit (DPU) processing system that is housed in a chassis; and
a DPU memory system that is housed in the chassis, that is coupled to the DPU processing system, and that includes instructions that, when executed by the DPU processing system, cause the DPU processing system to provide a DPU engine that is configured to:
   receive a service provisioning instruction to provide a hardware-enabled service for at least one client system;
   monitor, using an IHS load monitor that is coupled to the DPU processing system, one or more physical IHS components in the IHS and determine IHS operating load information that identifies utilization of the one or more physical IHS components in the IHS;
   determine, using host operating load information transmitted by a host subsystem load monitor in a host subsystem that is housed in the chassis with the DPU processing system and the DPU memory system, a host operating load that identifies a utilization of one or more physical host components in the host subsystem;
   determine, using the IHS operating load information determined by the IHS load monitor, an IHS operating load that identifies the utilization of the one or more physical IHS components in the IHS;
   provide, based on the host operating load and the IHS operating load indicating that the host subsystem should provide the hardware-enabled service, host software code to the host subsystem to configure the host subsystem to provide the hardware-enabled service;
   notify the at least one client system that the hardware-enabled service is available and that a service proxy provided by the DPU engine provides a service access point for the hardware-enabled service; and
   proxy, using the service proxy that abstracts the provisioning of the hardware-enabled service by the host subsystem to the at least one client system, service requests for the hardware-enabled service between the at least one client system and the host subsystem providing the hardware-enabled service to enable the host subsystem to provide the hardware-enabled service for the at least one client system.

8. The IHS of claim 7, wherein the DPU engine is configured to:
   provide, based on the host operating load and the IHS operating load indicating that the IHS should provide the hardware-enabled service during a first time period, DPU software code to the DPU engine to configure the DPU engine to provide the hardware-enabled service;
   perform, while providing the hardware-enabled service, service requests for the hardware-enabled service from the at least one client system; and
   provide, based on the host operating load and the IHS operating load indicating that the host subsystem should provide the hardware-enabled service during a second time period that is subsequent to the first time period, the host software code to the host subsystem to configure the host subsystem to provide the hardware-enabled service in order to migrate the hardware-enabled service from being provided by the DPU engine to being provided by the host subsystem.

9. The IHS of claim 8, wherein the providing the DPU software code to the DPU engine to configure the DPU engine to provide the hardware-enabled service based on the host operating load and the IHS operating load indicating that the DPU engine should provide the hardware-enabled service includes:

determining that the host operating load exceeds a host service provisioning threshold and, in response, providing the DPU software code to the DPU engine to configure the DPU engine to provide the hardware-enabled service, and wherein the configuring the host subsystem to provide the hardware-enabled service based on the host operating load and the IHS operating load indicating that the host subsystem should provide the hardware-enabled service includes:

determining that the host operating load is below a host service provisioning threshold and, in response, configuring the host subsystem to provide the hardware-enabled service.

10. The IHS of claim 7, wherein the DPU engine is configured to:

determine, using resource operating load information transmitted by a resource system load monitor in at least one resource system that is coupled to the DPU processing system via a network, a resource operating load that identifies a utilization of one or more physical resource components in the at least one resource system;

provide, based on the resource operating load, the host operating load, and the IHS operating load indicating that the host subsystem should provide the hardware-enabled service, the host software code to the host subsystem to configure the host subsystem to provide the hardware-enabled service.

11. The IHS of claim 10, wherein the DPU engine is configured to:

provide, based on the resource operating load, the host operating load, and the IHS operating load indicating that the at least one resource system should provide the hardware-enabled service during a first time period, resource software code to the at least one resource system to configure the at least one resource system to provide the hardware-enabled service;

proxy, using the service proxy that abstracts the provisioning of the hardware-enabled service by the at least one resource system to the at least one client system, service requests for the hardware-enabled service between the at least one client system and the at least one resource subsystem providing the hardware-enabled service; and provide, based on the resource operating load, the host operating load, and the IHS operating load indicating that the host subsystem should provide the hardware-enabled service during a second time period that is subsequent to the first time period, the host software to the host subsystem to configure the host subsystem to provide the hardware-enabled service in order to migrate the hardware-enabled service from being provided by the at least one resource system to being provided by the host subsystem.

12. The IHS of claim 11, wherein the providing the resource software to the at least one resource system to configure the at least one resource system to provide the hardware-enabled service based on the resource operating load, the host operating load, and the IHS operating load indicating that the at least one resource system should provide the hardware-enabled service includes:

determining that the host operating load exceeds a host service provisioning threshold and the resource operating load is below a resource service provisioning threshold and, in response, providing the resource software code to the at least one resource system to configure the at least one resource system to provide the hardware-enabled service, and wherein the providing the host software code to the host subsystem to configure the host subsystem to provide the hardware-enabled service based on the resource operating load, the host operating load, and the IHS operating load indicating that the host subsystem should provide the hardware-enabled service includes:

determining that the host operating load is below a host service provisioning threshold and, in response, providing the host software code to the host subsystem to configure the host subsystem to provide the hardware-enabled service.

13. The IHS of claim 11, wherein the DPU engine is configured to:

provide, based on at least one of the resource operating load, the host operating load, and the IHS operating load indicating that the DPU engine should provide the hardware-enabled service during a third time period that is subsequent to the second time period, the DPU engine to provide the hardware-enabled service;

perform, while providing the hardware-enabled service, service requests for the hardware-enabled service from the at least one client system.

14. A method for providing services using a host subsystem and a Data Processing Unit (DPU) subsystem, comprising:

receiving, by a Data Processing Unit (DPU) subsystem that is housed in a chassis, a service provisioning instruction to provide a hardware-enabled service for at least one client system;

monitor, by the DPU subsystem using a DPU subsystem load monitor, one or more physical DPU components in the DPU subsystem and determine DPU operating load information that identifies utilization of one or more physical DPU components in the in the DPU subsystem;

determining, by the DPU subsystem using host operating load information transmitted by a host subsystem load monitor in a host subsystem that is housed in a chassis with the DPU subsystem, a host operating load that identifies a utilization of one or more physical host components in the host subsystem;

determine, using the DPU operating load information determined by the DPU subsystem load monitor, a DPU operating load that identifies the utilization of the one or more physical DPU components in the DPU subsystem;

providing, by the DPU subsystem based on the host operating load and the DPU operating load indicating that the host subsystem should provide the hardware-enabled service, host software code to the host subsystem to configure the host subsystem to provide the hardware-enabled service;

notifying, by the DPU subsystem, the at least one client system that the hardware-enabled service is available and that a service proxy provided by the DPU engine provides a service access point for the hardware-enabled service;

proxying, by the DPU subsystem using the service proxy that abstracts the provisioning of the hardware-enabled service by the host subsystem to the at least one client system, service requests for the hardware-enabled service between the at least one client system and the host subsystem providing the hardware-enabled service; and providing, by the host subsystem, the service to the at least one client system in response to the service requests proxied by the DPU subsystem.

15. The method of claim 14, further comprising:

providing, by the DPU subsystem, based on the host operating load and the DPU operating load indicating that the DPU subsystem should provide the hardware-enabled service during a first time period, DPU software code to the DPU subsystem to configure the DPU subsystem to provide the hardware-enabled service;

performing, by the DPU subsystem while providing the hardware-enabled service, service requests for the hardware-enabled service from the at least one client system; and providing, by the DPU subsystem based on the host operating load and the DPU operating load indicating that the host subsystem should provide the hardware-enabled service during a second time period that is subsequent to the first time period, the host software code to the host subsystem to configure the host subsystem to provide the hardware-enabled service in order to migrate the hardware-enabled service from being provided by the DPU subsystem to being provided by the host subsystem.

16. The method of claim 15, wherein the providing the DPU software code to the DPU subsystem to configure the DPU subsystem to provide the hardware-enabled service based on the host operating load and the DPU operating load indicating that the DPU subsystem should provide the hardware-enabled service includes:

determining, by the DPU subsystem, that the host operating load exceeds a host service provisioning threshold and, in response, providing the DPU software code to the DPU subsystem to configure the DPU subsystem to provide the hardware-enabled service, and wherein the configuring the host subsystem to provide the hardware-enabled service based on the host operating load and the DPU operating load includes:

determining, by the DPU subsystem, that the host operating load is below a host service provisioning threshold and, in response, providing the host software code to the host subsystem to configure the host subsystem to provide the hardware-enabled service.

17. The method of claim 14, further comprising:

determining, by the DPU subsystem using resource operating load information transmitted by a resource system load monitor in at least one resource system that is coupled to the DPU subsystem via a network, a resource operating load that identifies a utilization of one or more physical resource components in the at least one resource system; and providing, by the DPU subsystem based on the resource operating load, the host operating load, and the DPU operating load indicating that the host subsystem should provide the hardware-enabled service, the host software code to the host subsystem to configure the host subsystem to provide the hardware-enabled service.

18. The method of claim 17, further comprising:

providing, by the DPU subsystem based on the resource operating load, the host operating load, and the DPU operating load indicating that the at least one resource system should provide the hardware-enabled service during a first time period, resource software code to the at least one resource system to configure the at least one resource system to provide the hardware-enabled service;

proxying, by the DPU subsystem using the service proxy that abstracts the provisioning of the hardware-enabled service by the at least one resource system to the at least one client system, service requests for the hardware-enabled service between the at least one client system and the at least one resource subsystem providing the hardware-enabled service; and providing, by the DPU subsystem based on the resource operating load, the host operating load, and the DPU operating load indicating that the host subsystem should provide the hardware-enabled service during a second time period that is subsequent to the first time period, the host software to the host subsystem to configure the host subsystem to provide the hardware-enabled service in order to migrate the hardware-enabled service from being provided by the at least one resource system to being provided by the host subsystem.

19. The method of claim 18, wherein the providing the resource software to the at least one resource system to configure the at least one resource system to provide the hardware-enabled service based on the resource operating load, the host operating load, and the DPU operating load indicating that the at least one resource system should provide the hardware-enabled service includes:

determining, by the DPU subsystem, that the host operating load exceeds a host service provisioning threshold and the resource operating load is below a resource service provisioning threshold and, in response, providing the resource software code to the at least one resource system to configure the at least one resource system to provide the hardware-enabled service, and wherein the providing the host software code to the host subsystem to configure the host subsystem to provide the hardware-enabled service based on the resource operating load, the host operating load, and the DPU operating load indicating that the host subsystem should provide the hardware-enabled service includes:

determining, by the DPU subsystem, that the host operating load is below a host service provisioning threshold and, in response, providing the host software code to the host subsystem to configure the host subsystem to provide the hardware-enabled service.

20. The method of claim 18, further comprising:

providing, by the DPU subsystem based on at least one of the resource operating load, the host operating load, and the DPU operating load indicating that the DPU engine should provide the hardware-enabled service during a third time period that is subsequent to the second time period, the DPU subsystem to provide the hardware-enabled service; and performing, by the DPU subsystem while providing the hardware-enabled service, service requests for the hardware-enabled service from the at least one client system.

* * * * *